US008751408B2

(12) United States Patent
Linton et al.

(10) Patent No.: US 8,751,408 B2
(45) Date of Patent: Jun. 10, 2014

(54) MANAGEMENT OF PROFESSIONAL DEVELOPMENT PLANS AND USER PORTFOLIOS

(71) Applicant: School Improvement Network, LLC, Midvale, UT (US)

(72) Inventors: Cory John Linton, Draper, UT (US); Chet Dee Linton, Sandy, UT (US); Benjamin Vance Anderson, Lehi, UT (US); Neil Jarman, West Jordan, UT (US); Logan James Brown, Centerville, UT (US)

(73) Assignee: School Improvement Network, LLC, Midvale, UT (US)

( * ) Notice: Subject to any disclaimer, the term of this patent is extended or adjusted under 35 U.S.C. 154(b) by 0 days.

(21) Appl. No.: 13/708,325

(22) Filed: Dec. 7, 2012

(65) Prior Publication Data

US 2013/0151431 A1 Jun. 13, 2013

Related U.S. Application Data

(60) Provisional application No. 61/568,119, filed on Dec. 7, 2011.

(51) Int. Cl.
*G06Q 50/00* (2012.01)
(52) U.S. Cl.
USPC .......................................................... 705/328
(58) Field of Classification Search
USPC .......................................................... 705/328
See application file for complete search history.

(56) References Cited

U.S. PATENT DOCUMENTS

| | | | |
|---|---|---|---|
| 5,987,443 A * | 11/1999 | Nichols et al. ................ | 706/11 |
| 6,987,945 B2 * | 1/2006 | Corn et al. ................... | 434/350 |
| 7,337,120 B2 * | 2/2008 | Andrus et al. ................ | 705/1.1 |
| 2003/0044762 A1 | 3/2003 | Bergan et al. | |
| 2003/0046265 A1 | 3/2003 | Orton et al. | |
| 2003/0229529 A1 * | 12/2003 | Mui et al. ..................... | 705/8 |
| 2004/0024569 A1 * | 2/2004 | Camillo ....................... | 702/182 |
| 2004/0088177 A1 * | 5/2004 | Travis et al. ................. | 705/1 |
| 2004/0219493 A1 | 11/2004 | Phillips | |
| 2005/0015291 A1 | 1/2005 | O'Connor | |
| 2005/0114203 A1 * | 5/2005 | Savitsky et al. .............. | 705/11 |
| 2006/0121435 A1 | 6/2006 | Chen et al. | |

(Continued)

OTHER PUBLICATIONS

KMC on Demand(SM) Introduces Compliance Genie: Answers industry call for help with compliance administration. PR Newswire [New York] Jun. 15, 2010.*

(Continued)

*Primary Examiner* — Amanda Kirlin
(74) *Attorney, Agent, or Firm* — Patent Law Works LLP

(57) ABSTRACT

An example system for managing professional development plans may include a plan management module for receiving data representing a development plan for one or more users and an achievement module. The achievement module may determine one or more achievements associated with the development plan and may provide the one or more achievements to a user device of a first user. The achievement module may receive an association of an achievement selected from the one or more achievements with the goal-related aspect of the development plan and associate the achievement with the goal-related aspect of the development plan. The system may further include a reporting module for generating, based on associating the achievement with the goal-related aspect, a report describing the progress of the first user on the development plan.

36 Claims, 19 Drawing Sheets

(56) References Cited

U.S. PATENT DOCUMENTS

| | | |
|---|---|---|
| 2007/0033082 A1 | 2/2007 | Hilliard et al. |
| 2007/0038505 A1* | 2/2007 | Barnes, IV et al. ............. 705/11 |
| 2007/0050238 A1 | 3/2007 | Carr et al. |
| 2009/0089154 A1 | 4/2009 | Dion |
| 2009/0162826 A1 | 6/2009 | Ayati et al. |
| 2010/0010880 A1 | 1/2010 | Toth et al. |
| 2011/0055035 A1* | 3/2011 | Koskay et al. ............... 705/26.1 |
| 2011/0055100 A1* | 3/2011 | Perreault et al. ............. 705/327 |

OTHER PUBLICATIONS

International Search Report and Written Opinion for PCT/US12/68554, Feb. 25, 2013, 14 pgs.

* cited by examiner

My Professional Learning Plans

Time Management [Edit] [Delete]
840 — 842
Time Management
Expires: May 31, 2012
Learn to manage my time more effectively 826 — 828
[Insert Goal ⊙] [Insert Action 👤]

▶ ⊙ Education
  ▶ 👤 Watch 3 Time Management Videos
    ▷ 🎬 Time Management Video #1  ✕ ✕ ✕
    • • •

▶ [New Plan] [Report] ☐ Show Expired Plan's

— 822
— 824

Time Management Video #1 [Edit]  Required — 880
Watched this video on time management basics.

Feedback History
J. Johnson (Principal of Middletown Elementary) – 04/12/2012
Have you considered watching the whole series of time management videos?
[Reply] — 874
— 872

• • •
— 876
[Add comment]

User: J. Johnson (Principal of Middletown Elementary)

Admin: Professional Learning Plan Progress

📁 Salt Lake City

📁 Middletown Elementary

▶ Filtering Options

| Professional Development Plans | Description | Created By | Start Date | Expiration Date |
|---|---|---|---|---|
| Time Management [Edit] | Learn to manage .... | M. Smith | 01/01/2012 | 05/31/2012 |
| Common Core [Edit] | Master implementa... | You | 03/01/2012 | 05/31/2012 |

⋮

950 ↙

Users Associated with Development Plan     952 ↙    954 [Edit]

| Name | % Complete | |
|---|---|---|
| Jill Adams | ▬▬▬▬▬▭ 70% | [Send Message] |
| Mike Brown | ▬▬▬▬▬▭ 70% | [Send Message] |

956     958

⋮

Details for Mike Brown

▼ ◉ Education     960 ⚠

▼ 🏃 Watch 3 Time Management Videos

▣ Time Management Video #1   ✓

⋮   962

Feedback History on Time Management Video #1

J. Johnson (Principal of Middletown Elementary) – 04/12/2012
Have you considered watching the whole series of time management videos?

M. Smith (1ˢᵗ Grade Teacher at Middletown Elementary)
Good idea, do you want me to add them or will you?

[Reply]

[Add more feedback]

MANAGEMENT OF PROFESSIONAL DEVELOPMENT PLANS AND USER PORTFOLIOS

CROSS-REFERENCE TO RELATED APPLICATIONS

This application claims the benefit under 35 U.S.C. §119(e) of U.S. Provisional Application No. 61/568,119, entitled "Interactive Content Management, Portfolio Management, and Content Navigation and Resource Suggestion", filed on Dec. 7, 2011, the entire contents of which are incorporated herein by reference.

BACKGROUND

The present disclosure relates to professional development. In particular, the present disclosure relates managing professional development plans and user portfolios.

In recent years, some educational and professional systems have been moving toward performance pay which provides that a portion of a professional's compensation may be tied to performance. However, these systems are often limited in managing and monitoring the professional development of these professionals. For example, current systems often lack online tools for professionals to use to plan their professional development, create and share portfolios of their accomplishments, or to easily report their progress on various development plans to their administrators. These systems are also generally limited in providing administrators with the ability to direct the professional development of those users that they oversee. For example, these systems often do not provide administrators with the ability to set and monitor specific goals and tasks for those users and follow-up and to provide feedback on those goals and tasks to those users.

SUMMARY

According to one innovative aspect of the subject matter described in this disclosure, a system may include one or more processors, a plan management module, and an achievement module. The plan management module is executable by the one or more processors to receive data representing a development plan for one or more users. The achievement module is executable by the one or more processors to determine one or more achievements associated with the development plan, to provide the one or more achievements to a user device of a first user, to receive an association of an achievement selected from the one or more achievements with the goal-related aspect of the development plan, and to associate the achievement with the goal-related aspect of the development plan. The achievement module is coupled to the plan management module or a data store to receive the data representing the development plan.

In general, another innovative aspect of the subject matter described in this disclosure may be embodied in a method performed by one or more computing devices that includes receiving a development plan for one or more users, the development plan including a goal-related aspect associated with a profession; determining one or more achievements associated with the development plan; providing the one or more achievements to a user device of a first user; receiving an association of an achievement selected from the one or more achievements with the goal-related aspect of the development plan; and associating the achievement with the goal-related aspect of the development plan.

Other implementations of one or more of these aspects include corresponding systems, apparatus, and computer programs, configured to perform the actions of the methods, encoded on computer storage devices.

These and other implementations may each optionally include one or more of the following features. For example, the operations may include generating, based on associating the achievement with the goal-related aspect, a report describing the progress of the first user on the development plan; providing the report to the user device of the first user or a user device of a second user that is an administrator of the first user for presentation using the one or more computing devices; receiving an assignment of the development plan from a second user that is an administrator of the first user; assigning the development plan to the first user for completion; receiving feedback from a second user regarding one or more of the goal-related aspect and the achievement, the second user being an administrator of the first user; providing the feedback from the second user to the first user; receiving a revision to the development plan based on providing the feedback; providing a listing of one or more training resources to a user device of a second user that is an administrator of the first user; providing a listing of one or more professionals including the first user to the user device of the second user; that data representing the development plan includes an assignment of a training resource to the first user for completion the data representing the development plan is received from the second user; assigning the development plan to the first user for completion; determining an assignment for the first user included in the development plan; determining a status for the assignment, the status describing whether the assignment has been completed by the first user; generating a report including the status; providing the report to a second user for review, the second user being an administrator of the first user; determining the assignment to be complete; and automatically facilitating provision of a continuing education credit to the first user based on determining the assignment to be complete.

For example, the features may include a reporting module executable by the one or more processors to generate, based on associating the achievement with the goal-related aspect, a report describing the progress of the first user on the development plan and to provide, for presentation, the report to the user device of the first user or a user device of a second user that is an administrator of the first user, the reporting module being coupled to the achievement module or the data store to receive the association of the achievement with the goal-related aspect; a data store; a communication unit for sending and receiving data via a network; that the data representing the development plan and data representing the one or more achievements are received via the communication unit and stored in the data store in association with the first user; that the plan management module is further configured to receive feedback from a second user that is an administrator of the first user regarding one or more of the goal-related aspect and the achievement and to provide the feedback from the second user to the first user; that the plan management module is further configured to receive, based on providing the feedback, a revision to the development plan; that the revision includes one or more of a goal, an action, and a task; that the plan management module is further configured to provide a listing of one or more training resources to a user device of a second user and to provide a listing of one or more professionals including the first user to the user device of the second user; that the second user is an administrator of the first user, the data representing the development plan includes an assignment of a training resource to the first user for completion and the data representing the development plan is received from the second user; that the plan management module is further configured to assign the development plan to the first user for completion; a reporting module executable by the one or more processors to determine an assignment for the first user included in the development plan, to determine a status for the assignment, the status describing whether the assignment has been completed by the first user, to generate a report including the status, and to provide the report to a second user for review, the second user being an administrator of the first user; and a reporting module executable by the one or more processors to determine an assignment for the first user included in the development plan, to determine the assignment to be complete, and to automatically facilitate provision of a continuing education credit to the first user based on determining the assignment to be complete.

BRIEF DESCRIPTION OF THE DRAWINGS

The disclosure is illustrated by way of example, and not by way of limitation in the figures of the accompanying drawings in which like reference numerals are used to refer to similar elements.

FIGS. 8A-H are graphic representations of example user interfaces for managing a development plan.

FIGS. 9A-C are graphic representations of example user interfaces for administrating development plans.

DETAILED DESCRIPTION

Example System

Figure 1:
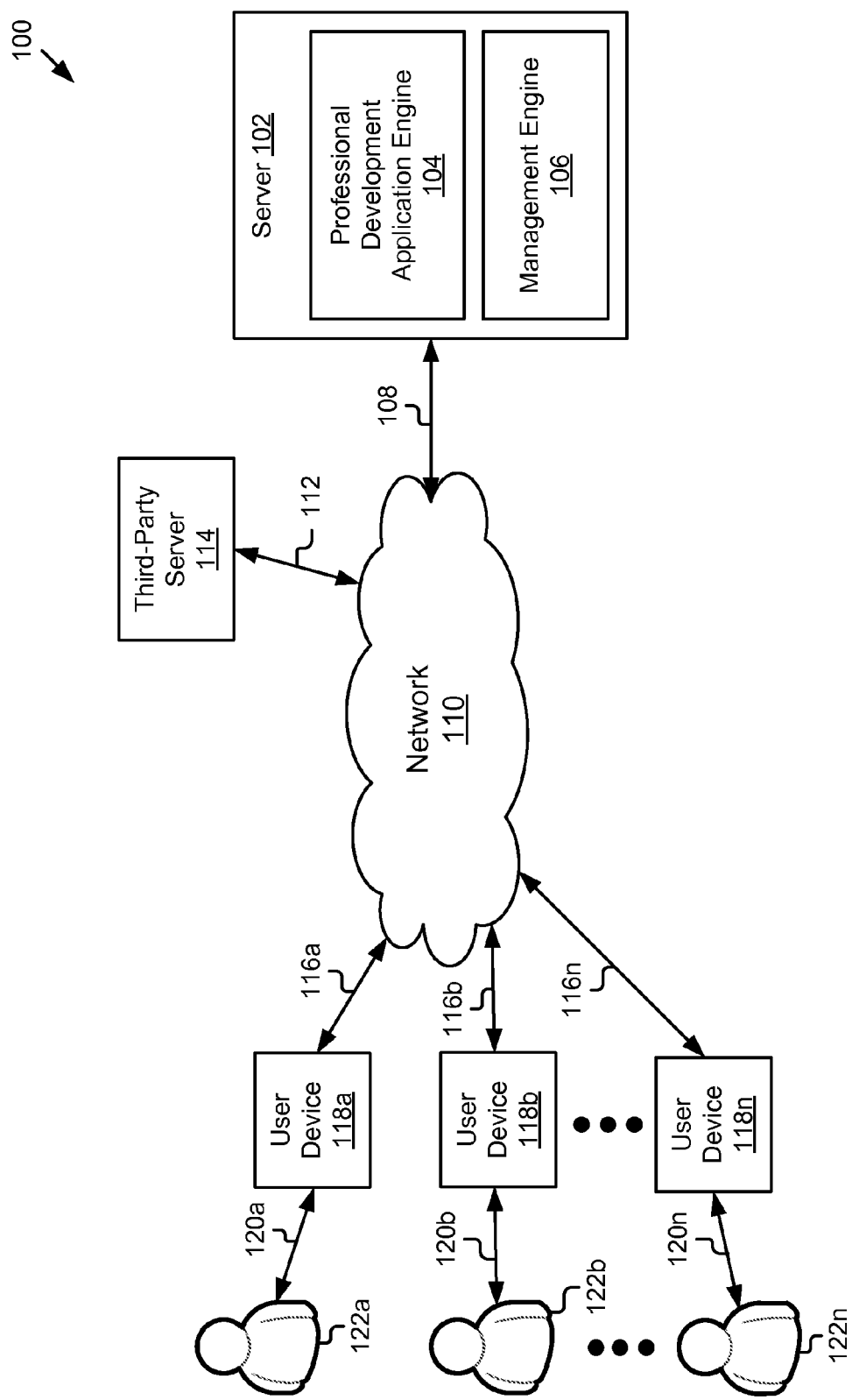
FIG. 1 is a block diagram of an example system for professional development.

FIG. 1 is a block diagram of an example system 100 for managing professional development. The architecture of system 100 includes a server 102, a network 110, a third-party server 114, user devices 118a, 118b . . . 118n (also referred to herein individually and collectively as 118) that are accessible by users 122a, 122b . . . 122n (also referred to herein individually and collectively as 122). In the illustrated embodiment, the entities 102, 114 and 118 are electronically communicatively coupled via the network 110. The system 100 illustrated in FIG. 1 is a representative system for managing professional development, and it should be understood that a variety of different system environments and configurations may be employed and are within the scope of the present disclosure. Other embodiments may include fewer or additional servers 102, third party servers 114, user devices 118, and other computing devices providing services, such as email, network and web search, social networking, text messaging, information, etc. Further, while the present disclosure is described above primarily in the context of activities related to professional development via the server 102, it is applicable to any type of educational activity performed via the entities of a network.

The server 102 is a computing device or system for providing a professional development service. In the depicted embodiment, the server 102 is coupled to the network 110 via signal line 108. The server 102 may include one or more processors and one or more storage devices storing data or instructions for execution by the one or more processors. For example, the server 102 may be a server, a server array or any other computing device, or group of computing devices, having data processing, storing, and communication capabilities. The server 102 may be a virtual server (i.e., a virtual machine) implemented via software. For example, the virtual server operates in a host server environment and accesses the physical hardware of the host server including, for example, a processor, memory, storage, network interfaces, etc., via an abstraction layer (e.g., a virtual machine manager). It should be understood that the server 102 may be made up of any combination of devices and servers, or only one of device or server. The server 102 may interact with the other entities 114 and 118 of the system 100 via the network 110 or may be coupled to and interact with the third-party server 114 or user devices 118 directly via a direct data connection.

In some embodiments, the entities of the system 100 including the server 102 may be implemented using cloud-based architectures where one or more computer functions are performed by remote computing systems and devices at the request of a local computer device. For example, a user device 118 may be a computing device having a limited set of hardware and/or software resources and may access hardware and/or software resources provided across the network 110 by other computer devices and resources, such as other user devices 118, the third-party server 114, the server 102, or any other computing resources. The user device 118 may access these resources through an access program, such as a web browser, and the results of any computer functions or resources may be delivered through the access program to the user 122 of the user device 118, such as those described below with reference to FIG. 3. The server 102 may be cloud-based distributed computing system having dynamically scalable and virtualizable resources, and various functionality of the server 102, professional development application engine 104, and management engine 106 may be carried out and supplemented by computing systems and devices distributed over the network 110. Although only one server 102 is shown, multiple servers 102 may be included in the system 100.

In FIG. 1, the server 102 includes a professional development application engine 104 and a management engine 106. The professional development application engine 104 is software including routines for providing network-based professional development training to professionals.

Professional development training includes teaching skills to participants, assisting participants in integrating and applying those skills to their profession, assessing the success of participants in applying the skills, and evaluating whether additional training is necessary. By way of example, professional development training may be used to improve the skills of teachers and school administrators, health care professionals such as nurses or physicians, legal professionals such as lawyers, judges or trustees, corporate professionals such as officers, directors, managers or other internal corporate employees, travel industry professionals such as pilots, drivers, skippers or the like, educational professionals such as teachers or professors, financial professionals such as accountants, brokers, traders, tax specialists or the like, human relations professionals, sales professionals, service industry professionals, government employees, or any other workforce that requires professional training and assessment as to the assimilation and effectiveness of such training.

In some embodiments, the professional development training may be provided by the professional development application engine 104 via the network 110 to teachers and administrators in an academic environment or other educational setting, such as a school district. In cooperation with the professional development application 302 (see FIG. 3), the professional development application engine 104 may provide these professionals access to a wide range of resources such as publications, audio or video resources, lesson plans, planning tools, community discussion and sharing tools, industry standards, progress monitoring tools, reporting tools, etc. These resources may describe various topics of interest, such as leadership training, math skills, communication skills, English skills, and similar subjects of consequence and importance to the professional development of educational instructors. These resources may be provided real-time via the internet by the professional development application engine 104. For example, a user 122 may use navigation or search functionality of the professional development application engine 104 to find relevant resources, and upon selection of a particular resource, the professional development application engine 104 may retrieve and transmit the resource (e.g., by streaming audio and/or video) to the user device 118 of the user 122 for presentation to the user 122. In other examples, relevant training resources may be suggested to a user 122 by the professional development application engine 104 based at least in part upon metadata associated with an identity of the user 122 in the data store 228 (see FIG. 2). Additional structure and functionality of the professional development application engine 104 are discussed below, for example, with reference to FIG. 2.

The management engine 106 is software including routines for managing, tracking, and reporting progress on development plans, and managing and sharing user portfolios. In some embodiments, the management engine 106 is a set of instructions executable by the processor 222 (see FIG. 2) for providing this functionality. In other embodiments, the management engine 106 is stored in the memory 224 (see FIG. 2) of the server 102 and is executable by the processor 222 (see FIG. 2). In any of these embodiments, management engine 106 may be adapted for cooperation and communication with the processor 222 (see FIG. 2) and the other components of the server 102 via the bus 220 (see FIG. 2). Additional structure and functionality of the management engine 106 are described below with reference to at least FIGS. 2-5B.

The network 110 may include any number of wired or wireless networks and may have any number of configurations such as a star configuration, token ring configuration or other known configurations. The network 110 may include a local area network (LAN), a wide area network (WAN) (e.g., the Internet), and/or any other interconnected data path across which multiple devices may communicate. The network 110 may be coupled to or include a mobile (cellular) network including distributed radio networks and a hub providing a wireless wide area network (WWAN), or other telecommunications networks. In some embodiments, the network 110 may include Bluetooth® communication networks for sending and receiving data. The network 110 may transmit data using a variety of different communication protocols including user datagram protocol (UDP), transmission control protocol (TCP), hypertext transfer protocol (HTTP), hypertext transfer protocol secure (HTTPS), file transfer protocol (FRP), dynamic adaptive streaming over HTTP (DASH), real-time streaming protocol (RTSP), real-time transport protocol (RTP) and the real-time transport control protocol (RTCP), direct data connection, wireless access protocol (WAP), various email protocols, etc. User devices 118 may couple to and communicate via the network 110 using a wireless and/or wired connection. In some embodiments, the user devices 118 include a wireless network interface controller for sending and receiving data packets to an access point of the network 110. For example, the user devices 118 may be Wi-Fi™ enabled devices which connect to wireless local area networks (WLANs), such as wireless hotspots, communicatively coupled to the network 110. The user devices 118 may also include one or more wireless mobile network interface controllers for sending and receiving data packets via a WWAN of the network 110.

The third-party server 114 is a computing device or system for providing various computing functionalities, services, and/or resources to the other entities of the system 100. In some embodiments, the third-party server 114 includes a server hosting a network-based software application operable to provide the computing functionalities, services and/or resources or functionalities, and to send data to and receive data from the server 102 and the user devices 118a, 118b . . . 118n via the network 110. The third-party server 114 is coupled to the network 110 via signal line 112. In some embodiments, the third-party server 114 includes a server, server array or any other computing device, or group of computing devices, having data processing, storing and communication capabilities. For example, the third-party server 114 may provide one or more services including professional development, internet searching; social networking; web-based email; blogging; micro-blogging; photo management; video, music and multimedia hosting, distribution, and sharing; business services; news and media distribution; or any combination of the foregoing services. It should be understood that the third-party server 114 is not limited to providing the above-noted services and may include any other network-based or cloud-based service. For simplicity, a single block for the third-party server 114 is shown. However, in other embodiments, several distinct third-party servers (not shown) may be coupled to the network via distinct signal lines to provide distinct or competing services. The third-party server 114 may require users to be registered and authenticate to use various functionality provided by the third-party server 114. In some embodiments, the third-party server 114 is coupled to the server 102 via the network 110 for authenticating a user 122 to access a service provided by the third-party server 114. In these embodiments, the third-party server 114 connects to the server 102 using an application programming interface (API) to send user credentials, such as data describing the user identifier and a password associated with the user identifier, and to receive an authentication token authorizing the user 122 access to the service. In other embodiments, the third-party server 114 may connect to the server 102 to utilize the functionality provided thereby.

The user devices 118a, 118b . . . 118n are computing devices having data processing and data communication capabilities. In some embodiments, the user device 118a is coupled to the network 110 via signal line 116a, and the user 122a interacts with the user device 118a as depicted by line 120a; the user device 118b is coupled to the network 110 via signal line 116b, and the user 122b interacts with the user device 118b as depicted by line 120b; and the user device 118n is coupled to the network 110 via signal line 116n, and the user 122n interacts with the user device 118n as depicted by line 120n.

In some embodiments, the user device 118 is a handheld wireless computing device which is capable of sending and receiving voice and data communications. For example, the user device 118 may include a processor, a memory, a power source, and a communication unit including one or more network interfaces for interacting with the network 110, such as wireless transceivers to broadcast and receive network data via radio signals. The user device 118 may also include one or more of a graphics processor; a high-resolution touchscreen; a physical keyboard; forward and rear facing cameras; sensors such as accelerometers and/or gyroscopes; a GPS receiver; a Bluetooth® module; memory storing applicable firmware; and various physical connection interfaces (e.g., USB, HDMI, headset jack, etc.); etc. Additionally, an operating system for managing the hardware and resources of the user device 118, application programming interfaces (APIs) for providing applications access to the hardware and resources, a user interface module for generating and displaying interfaces for user interaction and input, and applications such as applications for making phone calls, video calls, web browsing, messaging, social networking, gaming, capturing digital video and/or images, etc., may be stored and operable on the user device 118. In some embodiments, a user device 118 comprises a workstation computer, a desktop computer, a laptop computer, a netbook computer, a tablet computer, a smartphone, a set-top box/unit, an Internet Protocol-connected smart TV including a computer processor capable of receiving viewer input, accessing video content on computer networks such as the Internet, and executing software routines to provide enhanced functionality and interactivity to viewers, or the like. In other embodiments, different user devices 118a, 118b . . . 118n comprise different types of computing devices. For example, the user device 118a is a smartphone, the user device 118b is a mobile phone of the non-smart phone variety, and the user device 118n is a tablet computer. In some embodiments, the user device 118 is a client or terminal device. While FIG. 1 illustrates three or more user devices, the present disclosure applies to any system architecture having one or more user devices. Additional structure and functionality of the user devices 118 are described below with reference to at least FIG. 3.

Example Server 102

Figure 2:
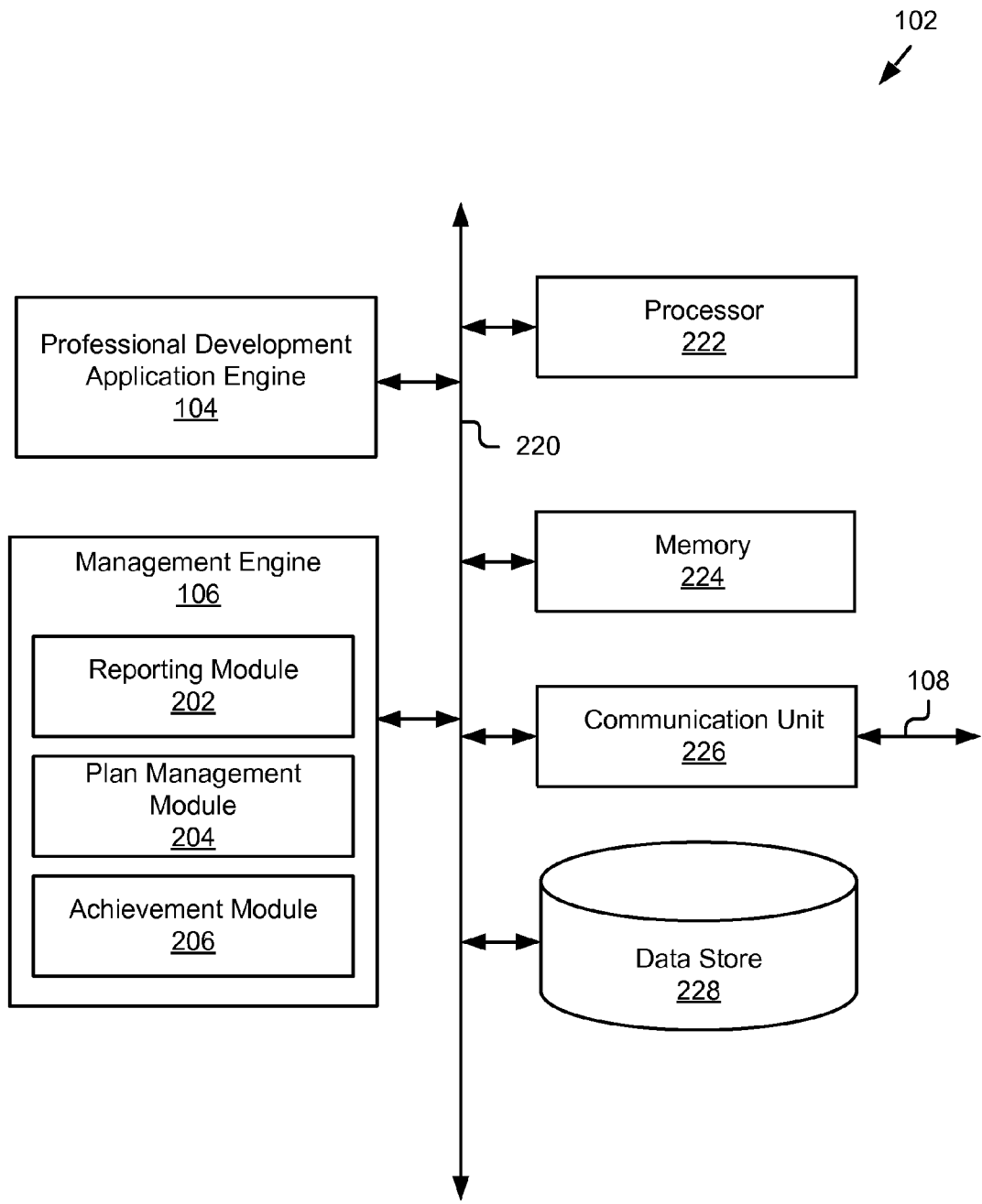
FIG. 2 is a block diagram of an example server.

FIG. 2 is a block diagram of an example server 102. In the depicted embodiment, the server 102 is a computing device comprising the professional development application engine 104, the management engine 106, a processor 222, a memory 224, a communication unit 226, and a data store 228. The components 104, 106, 222, 224, 226, and 228 are communicatively coupled via a communication bus 220. The bus 220 can be any type of conventional communication bus for transferring data between components of a computer, or between computers.

The processor 222 may include an arithmetic logic unit, a microprocessor, a general purpose controller, or some other processor array to perform computations and provide electronic display signals to a display device (not shown). The processor 222 is coupled to the bus 220 for communication with the other components of the server 102. Processor 222 processes data signals and may comprise various computing architectures including a complex instruction set computer (CISC) architecture, a reduced instruction set computer (RISC) architecture, or an architecture implementing a combination of instruction sets. Although only a single processor 222 is shown in FIG. 2, multiple processors may be included. The processing capability might be limited to supporting the display of images and the capture and transmission of images. The processing capability might be enough to perform more complex tasks, including various types of feature extraction and sampling. It should be understood that other processors, operating systems, sensors, displays and physical configurations are possible.

The memory 224 stores instructions and/or data that may be executed by processor 222. The memory 224 is coupled to the bus 220 for communication with the other components of server 102. The instructions and/or data may comprise code for performing any and/or all of the techniques described herein. The memory 224 may be a dynamic random access memory (DRAM) device, a static random access memory (SRAM) device, flash memory, or some other known memory device. In some embodiments, the memory 224 also includes a non-volatile memory or similar permanent storage device and media including, for example, a hard disk drive, a floppy disk drive, a CD ROM device, a DVD ROM device, a DVD RAM device, a DVD RW device, a flash memory device or some other mass storage device known for storing information on a more permanent basis. For clarity, instructions and/or data stored by the memory 224 or 308 (see FIG. 3) are described herein as different functional "modules" or "engines," where different modules or engines are different instructions and/or data stored in the memory 224 or 308 (see FIG. 3) that cause the described functionality when executed by the processor 222 or 306 (see FIG. 3).

The communication unit 226 is coupled to the network 110 by the signal line 108 and coupled to the bus 220. In some embodiments, the communication unit 226 is a network interface device (I/F) which includes ports for wired connectivity. For example, the communication unit 226 includes a CAT-5 interface, USB interface, or SD interface, etc. The communication unit 226 may link the processor 222 to the network 110, which may in turn be coupled to other processing systems. The communication unit 226 provides other connections to the network 110 and to other entities of the system 100 using standard communication protocols including, for example, TCP/IP, HTTP, HTTPS, SMTP, etc. In other embodiments, the communication unit 226 includes a transceiver for sending and receiving signals using Wi-Fi, Bluetooth® or cellular communications for wireless communication.

Example Management Engine 106

The management engine 106 is software including routines for managing development plans and user portfolios. In some embodiments, the management engine 106 is operable on the server 102. In other embodiments, the management engine 106 is operable on the client user device 118. While FIG. 1 only illustrates the server 102 as including the management engine 106, in practice, any of the depicted devices, such as the user devices 118 and the third-party server 114 could include the management engine 106. In some embodiments, the management engine 106 may provide users 122 with a platform for creating, editing, and fulfilling development plans, and for creating, editing, and sharing user portfolios. In these or other embodiments, the management engine 106 may provide administrator/users 122 with a platform for creating, editing, assigning, and monitoring development plans, and provide administrators/users 122 and non-administrator/users 122 alike functionality for generating reports describing the status and/or fulfillment of development plans.

In addition to its plain and ordinary meaning, the term development plan includes one or more structured or unstructured goal-related aspects defined by a user 122 or a user's 122 administrator. The aspects may be "loose" goals, action items, etc. requiring the user 122 to take some action with respect to a certain area of interest, or may be strict goals requiring the user 122 to perform precise tasks. For example, a loose goal and/or action item may require a user 122 to attend at least one education seminar of the user's choice, and a strict goal and/or action item may require a user 122 to watch a certain video to completion. The aspects of a given development plan may be organized by category or classification or may be unstructured. In some embodiments, a development plan may change over time. For example, a user 122 may create a private development plan including initial goal-related aspects and add additional aspects to it over time. In another example, a development plan created by an administrator/user 122 and assigned to a teacher/user 122 may be added to by the teacher/user 122 to cover additional items undertaken by the teacher/user 122. The teacher/user 122 may be prevented by the management engine 106 from modifying underlying development plan created by the administrator/user 122 or may be allowed to modify the plan to conform to his or her needs. These examples, as well as and all other examples provided herein, are provided by way of illustration and not by way of limitation. For clarity, a development plan may also be referred to herein as a professional development plan or professional learning plan.

In some embodiments, a user 122 may create any number of development plans to track his or her progress in a variety of areas. In some embodiments, one or more developments plans may represent a portfolio of a user's 122 achievements. By way of example, a teacher/user 122 may create a portfolio of development plans, one for each semester the user 122 teaches. Each development plan could include the goals for each semester, and as the user 122 completes tasks, activities, etc. during each semester that are associated with goals of that semester, the user 122, using the functionality of the professional development application 302 in cooperation with the management engine 106, may keep record of those tasks, activities, etc., track his or her progress in accomplishing those goals, and provide a report of the satisfaction of those goals to other users 122, such as an administrator on a semester by semester basis.

In some embodiments, the user 122 may use the management engine 106 to create, manage, and share a portfolio of accomplishments. The portfolio may be linked to or may be independent of a development plan. In some embodiments, the user 122, via an associated user interface displayed by the professional development application 302, may provide input defining a portfolio, the achievements to include in the portfolio, whether the portfolio should be private, semi-private, or publically accessible via the management engine 106, the users, if any, that the portfolio should be shared with (e.g., an administrator), etc., and the professional development application 302 may send corresponding portfolio data representing the portfolio to the management engine 106 for storage in the data store 228. An example portfolio is further discussed below with reference to at least FIG. 10.

As depicted in FIG. 2, the management engine 106 may include a reporting module 202, a plan management module 204, and an achievement module 206. The components 202, 204 and 206 of the management engine 106, and the management engine 106 itself, may be coupled via the processor 222 and/or the bus 220 for communication with each other and the other components 104, 224, 226 and 228 of the server 102. The management engine 106 may interact and communicate with the professional development application engine 104. For example, the management engine 106 can interact with a credentials module (not shown) of the professional development application engine 104 to authenticate users 122 seeking access to the management engine 106, and to provide the management engine 106 access to information and functionality of the professional development application engine 104. In some embodiments, the management engine 106 may be stored and operable on a third-party server (not shown) which is coupled to the network 110 for communication and interaction with the server 102 and the professional development application engine 104. In these or other embodiments, the management engine 106 may access information and utilize the functionality of the professional development application engine 104 via an API.

In some embodiments, the professional development application engine 104 includes a set of instructions executable by the processor 222 for providing its functionality. In other embodiments, the professional development application engine 104 is stored in the memory 224 of the server 102 and is executable by the processor 222. In any of these embodiments, the professional development application engine 104 may be adapted for cooperation and communication with the processor 222 and the other components of the server 102 via the bus 220.

The reporting module 202 is software including routines for generating and sending a report describing the status of a development plan. In some embodiments, the reporting module 202 is a set of instructions executable by the processor 222 to provide this functionality. In other embodiments, the reporting module 202 is stored in the memory 224 of the server 102 and is accessible and executable by the processor 222 to provide this functionality. In any of these embodiments, the reporting module 202 may be adapted for cooperation and communication with the processor 222 and other components of the server 102 via the bus 220.

In some embodiments, the reporting module 202 may summarize the elements/aspects (e.g., goals, actions, tasks, categories, etc.) that make up the development plan, determine whether the elements have been completed, and generate a report describing the same. In these or other embodiments, the reporting module 202 may analyze a development plan associated with a user 122 for complexity, completeness, interaction, and other attributes, and generate a report describing the analysis. To analyze the development plan, the reporting module 202 may retrieve development plan data for the user 122 for which the report is being generated and analyze the development plan data for information describing the various aspects (e.g., goals, tasks, etc.) completed so as to satisfy the development plan. The reporting module 202 may also analyze the development plan data for a deadline or a date range and may use the deadline or date range to determine if the tasks were completed in a timely fashion. In some embodiments, the report generated by the reporting module 202 may describe the goals, actions items and tasks associated with the goals, which goals, action items, tasks, etc. were completed and which were not completed, etc. The report may also include representations of electronic files and other information as evidence that various goal-related aspects of the development plan were satisfied. In some embodiments, a user 122 may provide evidence for/associate his/her achievements with the various aspects of the development plan using the interfaces discussed below with reference to at least FIGS. 8A-H.

In some embodiments, the reporting module 202 may generate a report in response to receiving a report instruction. The report instruction may be automatically generated and provided by the management engine 106 at certain intervals, times, etc., may be received remotely via an application programming interface API of the management engine 106, may be provided by the professional development application 302 of the user device 118, etc. For example, the user 122 of the user device 118 may input a command into the user device 118 via the professional development application 302 commanding that a report be provided describing the status of his or her development plan or a development plan of another user 122 that the user 122 oversees. Responsive to receiving the command, the professional development application 302 may generate and send a report instruction via the network 110 instructing the reporting module 202 to generate the report based at least in part on the command input by the user 122, and the reporting module 202 generates the report accordingly. In some embodiments, the reporting module 202 may transmit the report to the professional development application 302 for display to the user 122, provide the report for download as a portable document, transmit (e.g., via email, instant message, text message, internal message, etc.) the report to one or more other users 122 designated by the instruction instructing the reporting module 202 to generate the report, etc.

The reporting module 202 provides a number of advantages including allowing a user 122 to provide a report evidencing the user's achievements to an administrator/user 122. For example, a teacher may use the reporting functionality of the reporting module 202 to send a development plan to an administrator to show the administrator that teacher has completed certain required tasks and/or performed other tasks above and beyond what was required at his or her own volition. In another example, many professions require members to acquire a certain number of educational credits to remain certified or licensed as professionals. Often the educational credits are acquired by completing educational programs. The reporting module 202 provides a convenient way to establish that certain tasks/activities/requirements needed to qualify for credit were completed.

The plan management module 204 is software including routines for managing the creation, modification, and assignment of development plans, and managing the creation, modification, and sharing of user portfolios. In some embodiments, the plan management module 204 is a set of instructions executable by the processor 222 to provide this functionality. In other embodiments, the plan management module 204 is stored in the memory 224 of the server 102 and is accessible and executable by the processor 222 to provide this functionality. In any of these embodiments, the plan management module 204 may be adapted for cooperation and communication with the processor 222 and other components of the server 102 via the bus 220. For example, the plan management module 204 is coupled to communication unit 226 to send and receive data via the network 110 to the other entities of the system 100, and is coupled to the data store 228 for storing, manipulating, and retrieving data.

In some embodiments, the plan management module 204 is coupled via the network 110 to each instance of the professional development application 302 for sending and receiving data associated with the management of development plans and portfolios. In some embodiments, a user 122 defines and modifies a development plan or portfolio using a corresponding interface of the professional development application 302, such as those described below with references to FIGS. 8A-10. In some embodiments, as a development plan is being defined, modified, and associated with certain tasks, activities, etc., the professional development application 302 may send development plan data describing the development plan, tasks, activities, etc., to the plan management module 204 and the plan management module 204 may store and/or updates the development plan data in the data store 228 for later retrieval, revision or completion by the user 122. The plan management module 204 may be configured to manage user portfolios (i.e., portfolio data) in a similar manner. For clarity, the development plan data describing the association of a task with a goal of the development plan is also referred to herein as association data.

Development plan data may include a due date or date range that the goals of the development plan represented by the development plan data must be completed by. Development plan data may also include assignment data assigning the plan to one or more other users 122 for completion. For example, a development plan may be created by an administrator/user 122 who is identified by the plan management module 204 as an administrator over other users 122's user accounts in the professional development application engine 104. As a further example, an administrator/user 122 may be a principal who oversees a group of teachers, or may be a district administrator overseeing a number of principals and teachers, etc., and may be registered as such in the data store 228. In these embodiments, the administrator/user 122 may create and assign one or more development plans via the user interfaces described herein with reference to at least FIGS. 8A-9B.

In some embodiments, the plan management module 204 may compare the requirements/goals of a development plan to the tasks of the development plan and generate progress information describing the relative progress the user 122 is making toward completing the goal or goals included in the development plan. In other embodiments, the plan management module 204 may cooperate with achievement module 206 to determine which tasks the user 122 has completed and may automatically associate that task with the goals of the development plan using metadata associated with the tasks (e.g., metadata associated with a video, course, journal entry, etc.). The automatic association may be provisional, and may be provided for display to the user 122 via the professional development application 302 for review and approval. In some embodiments, the plan management module 204 is coupled to the achievement module 206 via the bus 220 to send development plan information and receive achievement data describing the achievements of a user 122 based on the development plan information. For example, the plan management module 204 may provide a unique identifier identifying the development plan of the user 122 to the achievement module 206 and the achievement module 206 may return achievement data describing the achievements of a user 122 based at least In part upon the unique identifier. In the foregoing embodiments, the plan management module 204 may receive a progress signal from the professional development application 302 requesting the progress information, and the plan management module 204 may generate the progress information in response thereto and provide it to the professional development application 302 for display to the user, for example, in the form of a progress bar or as a side by side or illustrative comparison with the user's 122 development plan.

The achievement module 206 is software including routines for aggregating and providing the achievements of a user 122. In some embodiments, the achievement module 206 is a set of instructions executable by the processor 222 to provide this functionality. In other embodiments, the achievement module 206 is stored in the memory 224 of the server 102 and is accessible and executable by the processor 222 to provide this functionality. In any of these embodiments, the achievement module 206 may be adapted for cooperation and communication with the processor 222 and other components of the server 102 via the bus 220. For example, the achievement module 206 is coupled to communication unit 226 to send and receive data via the network 110 to the other entities of the system 100, and is coupled to the data store 228 for storing, manipulating, and retrieving data.

In some embodiments, the achievement module 206 cooperates with the professional development application engine 104 to determine tasks that a user 122 has completed. For example, using the professional development application 302 in conjunction with the professional development application engine 104, a user 122 may complete tasks and/or activities such as watch one or more videos on a number of professional topics, be provided with and/or respond to one or more observations made by an administrator, complete and/or participate in one or more courses, make one or more journal entries on certain subjects or topics, upload one or more files to the professional development application engine 104 while interacting with other users 122 in a community discussion, complete course work, respond to observations, create hyperlinks to other content or resources available on the network 110, use any other functionality of the professional development service provided by the professional development application engine 104, etc. As the user 122 engages in these tasks and/or activities, the professional development application engine 104 may store record of these tasks and/or activities, their level of completion, the date and time they were completed, etc., as achievement information in the data store 228. To aggregate the achievements of a particular user, the achievement module 206 may query this achievement information for the achievements associated with the user. In some embodiments, the achievement module 206 may filter the achievements of the user 122 using one or more predefined criteria. For example, the achievement module 206 may filter the achievements of the user 122 using a date range, level of completeness, level of engagement, difficulty, topic, etc. By way of example, the achievement module 206 may aggregate only videos that have been watched by the user 122 to completion. In some embodiments, the criteria for filtering the achievements may be defined by the user 122 who created a given development plan and stored in the data store 228 with the development plan data describing the development plan. Additional structure and functionality of the management engine 106, reporting module 202, plan management module 204, and achievement module 206 are described below with reference to at least FIGS. 4-10.

Example User Device 118

Figure 3:
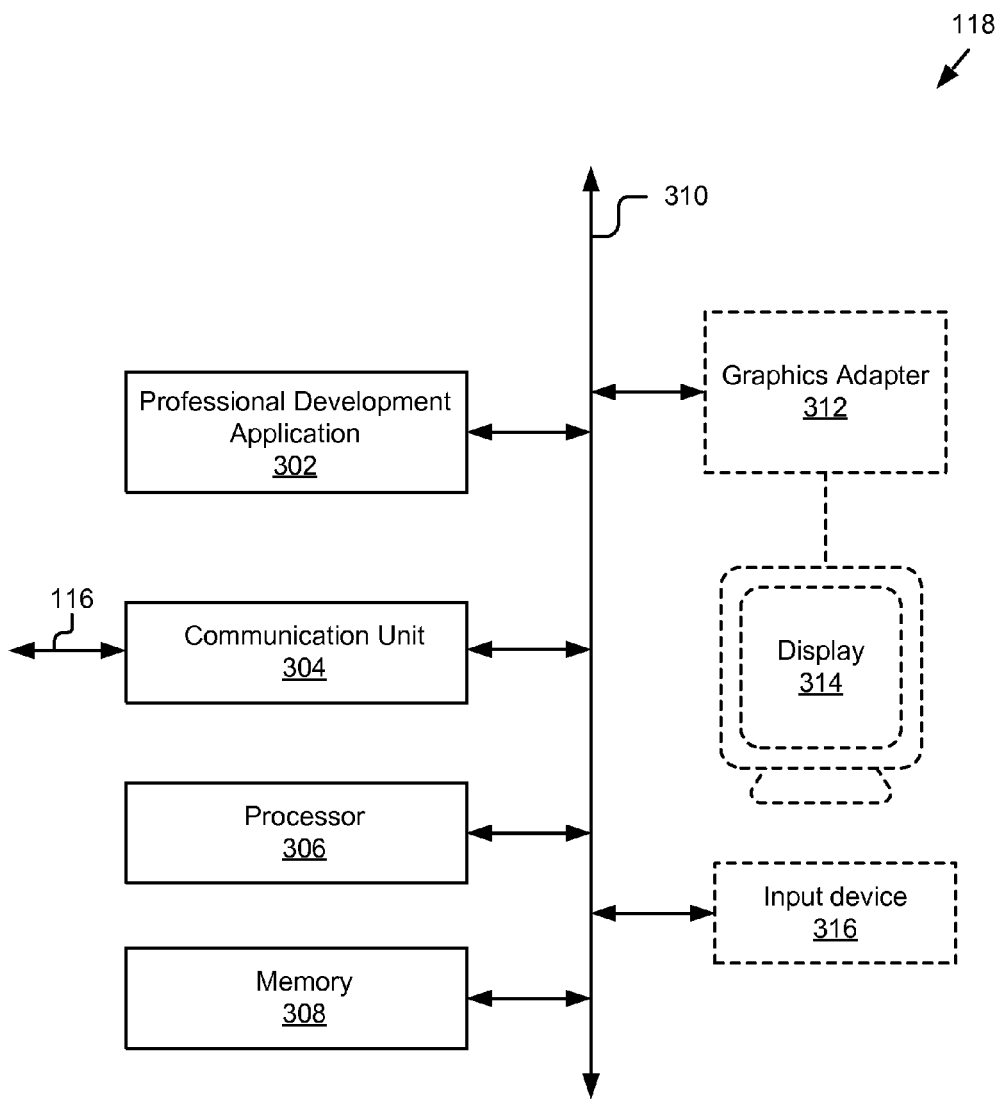
FIG. 3 is a block diagram of an example user device.

FIG. 3 is a block diagram of an example user device 118. In the depicted embodiment, the user device 118 includes the professional development application 302, a communication unit 304, a processor 306, a memory 308, a graphics adapter 312, and an input device 316. The user device 118 also includes a display 314, which is coupled to the graphics adapter 312. The components 302, 304, 306, 308, 312, 314 and 316 are communicatively coupled via the bus 310. The bus 310 may be any type of communication bus configured to connect the components of the user device 118 for exchanging data. The bus 310 may include one or more of a variety of bus architectures including a memory bus, memory controller, a peripheral bus, a local bus, etc. The graphics adapter 312, the display 314, and the input device 316 are depicted using dashed lines to indicate that they are optional features of the user device 118. Additional structure and functionality of the user device 118 is also discussed above with reference to FIG. 1.

The processor 306 comprises an arithmetic logic unit, a microprocessor, a general purpose controller, or some other processor array to perform computations and optionally provide electronic display signals to the display device 314. The processor 306 communicates with the other components via the bus 310. The processor 306 processes data signals and may comprise various computing architectures including a complex instruction set computer (CISC) architecture, a reduced instruction set computer (RISC) architecture, or an architecture implementing a combination of instruction sets. Although only a single processor 306 is shown in FIG. 3, multiple processors may be included. The user device 118 may also include an operating system executable by the processor 306.

The memory 308 may store instructions and/or data that may be executed by processor 306. The memory 308 may communicate with the other components of the user device 118 via bus 310. The instructions and/or data comprise code for performing any and/or all of the techniques described herein. The memory 308 may be a dynamic random access memory (DRAM) device, a static random access memory (SRAM) device, flash memory, or some other known memory device. In some embodiments, the memory 308 may also include a non-volatile memory or similar permanent storage device and media including, for example, a hard disk drive, a floppy disk drive, a CD ROM device, a DVD ROM device, a DVD RAM device, a DVD RW device, a flash memory device or some other mass storage device known for storing information on a more permanent basis.

The communication unit 304 may include interfaces for interacting with other devices/networks of devices. In some embodiments, the communication unit 304 includes transceivers for sending and receiving wireless signals. For example, the communication unit 304 includes radio transceivers (4G, 3G, 2G, etc.) for communication with the mobile network, and/or radio transceivers for Wi-Fi™ connectivity. The communication unit 304 may also include transmission devices configured for Bluetooth® connectivity, near field communication (NFC), etc. In the depicted embodiment, the communication unit 304 is coupled to the network 110 via signal line 116 for communication and interaction with the other entities coupled to the network 110. In these or other embodiments, the communication unit 304 may include a network interface device (I/F), which includes ports for wired connectivity. For example, the communication unit 304 includes a CAT-5 interface, USB interface, or SD interface, etc.

The graphics adapter 312 may display images and other information on the display 314. The graphics adapter 312 may be a separate processing device including a separate processor and memory (not shown) or may be integrated with the processor 306 and memory 308. The display 314 represents any device equipped to display electronic images and data as described herein. The display 314 may be any of a conventional display device, monitor or screen, such as an organic light-emitting diode (OLED) display, a liquid crystal display (LCD). In some embodiments, the display 314 is a touch-screen display capable of receiving input from one or more fingers of a user 122. For example, the display 314 may be a capacitive touch-screen display capable of detecting and interpreting multiple points of contact with the display surface.

The input device 316 is any device for inputting data on the user device 118. In some embodiments, the input device 316 is a touch-screen display capable of receiving input from the one or more fingers of the user 122. The functionality of the input device 316 and the display 314 may be integrated, and a user 122 of the user device 118 may interact with the user device 118 by contacting a surface of the display 314 using one or more fingers. For example, the user 122 interacts with an emulated (i.e., virtual or soft) keyboard displayed on the touch-screen display 314 by using fingers to contacting the display in the keyboard regions. In other embodiments, the input device 316 is a separate peripheral device or combination of devices. For example, the input device 316 includes a keyboard (e.g., a QWERTY keyboard) and a pointing device (e.g., a mouse or touchpad). The input device 316 may also include a microphone, a web camera, or other similar audio or video capture devices.

Example Professional Development Application 302

With reference to FIG. 3, the user device 118 contains the professional development application 302 for interacting with the professional development application engine 104 and the management engine 106 of the server 102, and the other entities of the systems 100, such as the third-party server 114. In some embodiments, the professional development application 302 cooperates with the professional application development engine 104 and the management engine 106 via the network 110 to provide the functionality described herein. While the professional development application 302 is described herein as including various structure and functionality, it should be understood that, in other embodiments, the structure and functionality could be performed, at least in part, by the professional development application engine 104 and/or the management engine 106, and vice versa, and that these other embodiments are within the scope of the present disclosure.

In some embodiments, the professional development application 302 is a set of instructions executable by the processor 306 to provide this functionality. In other embodiments, the professional development application 302 is stored in the memory 308 of the user device 118 and is accessible and executable by the processor 306 to provide the functionality. In any of these embodiments, the professional development application 302 may be adapted for cooperation and communication with the processor 306 and the other components 304, 308, 312, 314 and 316 of the user device 118 via the bus 310. In some embodiments, the professional development application 302 is client code operable as a web browser, a customized client-side application, or a combination of both. For example, the professional development application 302 may be client code downloadable from an application marketplace operated by a third-party server 114, such as an application storefront ("appstore"), and operable as a client-side application that includes the features described herein.

The professional development application 302 may generate user interfaces for displaying, viewing, navigating, and editing, etc., information received from the professional development application engine 104 and/or the management engine 106, receiving input signals from a user 122; generate data and instructions based on the input signals; and send the data and instructions to the server 102 or third-party server 114. In some embodiments, the professional development application 302 generates user interfaces, such as those depicted in FIGS. 8-10, based at least in part on information received from the management engine 106, the professional development application engine 104, and/or the third-party server 114 via the network 110. For example, the professional development application 302 may receive, at least in part, interface instructions from the server 102 or third-party server 114 via the network 110 in the form of a mark-up language (e.g., HTML, XML, etc.), style sheets (e.g., CSS, XSL, etc.), graphics, and/or scripts (e.g., JavaScript, ActionScript, etc.), and the professional development application 302 may interpret the interface instructions and render an interactive Web User Interface (WUI) for display on a user device 118 based thereon.

In some embodiments, the professional development application 302 is coupled to the input device 316 via the bus 310 to receive input signals from the user 122. In some embodiments, the user interfaces generated by the professional development application 302 include user interface elements that allow the users 122 to interact with the user devices 118 and input information and commands, such as text entry fields, selection boxes, drop-down menus, buttons, virtual keyboards and numeric pads, etc. Examples of user interfaces generated by the professional development application 302 can include, but are not limited to, the user interfaces depicted in FIGS. 8A-10, which are further discussed below.

Example Methods

Figure 4:
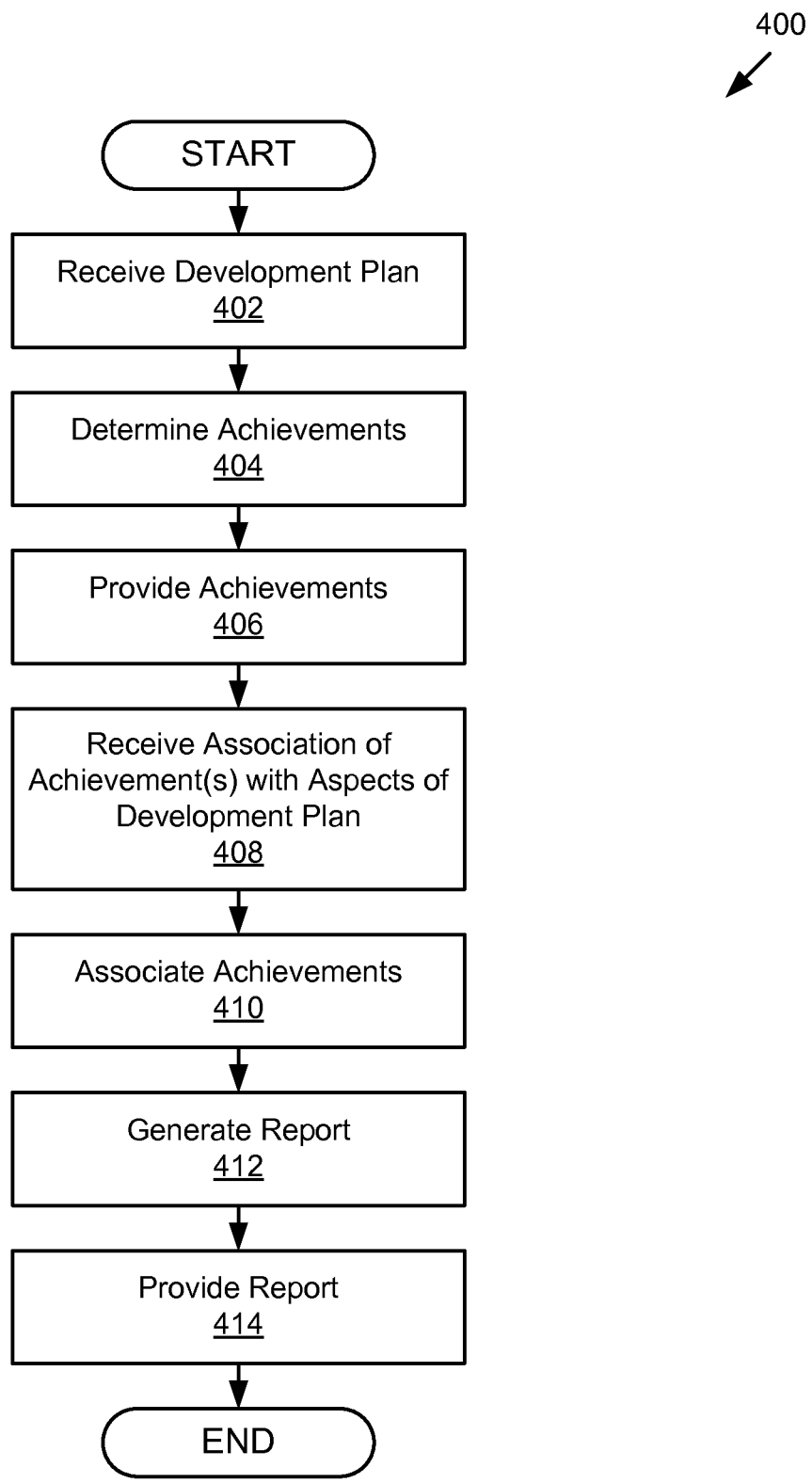
FIG. 4 is a flowchart of an example method for managing a development plan.

FIG. 4 is a flowchart of an example method 400 for managing a development plan. The method 400 begins by the plan management module 204 receiving 402 a development plan. In some embodiments, the development plan is received 402 from the professional development application 302 in the form of development plan data and the plan management module 204 stores the development plan data in the data store 228. Prior to or while storing the development plan data, the plan management module 204 may format the data. The method 400 continues by the achievement module 206 determining 404 achievements associated with the development plan data. In some embodiments, the achievement module 206 queries the data store 228 for data describing tasks or actions performed and/or being performed by the user 122 and determines/generates 404 the achievement data based at least in part on the results of the query. The achievement module 206 may filter these tasks using predefined criteria. For example, the achievement module 206 may use criteria associated with the development plan data, such as date range for the development plan described by the data to filter the tasks and/or actions performed or being performed by the user 122. The achievement module 206 may also use criteria associated with the underlying achievement data, such as whether a task has been fully completed, to filter the tasks and/or actions performed or being performed by the user 122.

The method 400 may continue by the achievement module 206 providing 406 the achievement data to the professional development application 302 for display to the user 122. Next, the plan management module 204 may receive 408 association data from the professional development application 302 describing the association of a task and/or item with a goal of the development plan, and the plan management module 204 may associate 410 the task and/or item with one or more goal-related aspects (e.g., goals, actions, tasks, etc.) of the development plan. In some embodiments, the plan management module 204 associates 410 the task and/or item with the one or more aspects of the development plan by updating/annotating the development plan data stored in the data store 228 to reflect the association of the task and/or item with the aspect. In some embodiments, blocks 406 and 408 may be omitted and the method 400 may automatically determine 404 and associate 410 the achievements of the user 122 with aspect(s) (e.g., required task(s)) of the development plan. For example, the user 122 may have performed an activity (e.g., viewed an online training video, created and uploaded a lesson plan, etc.) via the professional development engine 104 and/or management engine 106 and the achievement module 206 may automatically determine the performance of the activity as an achievement by referencing the record of the activity in the data store 228 and associating it with a required task of the development plan in the data store 228.

The method 400 may continue by the reporting module 202 generating 412 a report describing the status of the development plan and providing 414 the report to one or more recipients. In some embodiments, the report is generated 412 based at least in part on the reporting module 202 receiving a report instruction. The report instruction may be automatically generated by the management engine 106, the professional development application engine 104, or another source, or the instruction may be generated and sent by the professional development application 302 via the network 110. For example, a user 122 may provide input instructing a report be generated by the reporting module 202 using a user interface provided by the professional development application 302, and the professional development application 302 may generate the report instruction and transmit it to the reporting module 202 for execution. The method 400 may then provide 414 the report to one or more recipients. The recipients and/or the mechanism for providing 414 the report may be defined by the report instruction or may be predefined as a setting stored as data in the data store 228. In some embodiments the report is provided 414 to one or more recipients via electronic message (e.g., email, SMS/MMS message, etc.) as a dataset (e.g., webpage, HTML, XML, JSON, PDF, etc.) configured to be rendered and displayed to the user 122 via the professional development application 302, or any other means for communicating information electronically. The recipient(s) may include the user 122 who requested the report, user(s) specified by the requestor/user 122 such as an administrator of the requestor/user 122. The report may be transmitted 414 to the professional development application 302 for display to the designated recipient(s), or for saving and/or further distribution by the recipient(s). The method 400 is then complete and ends.

Figure 5A:
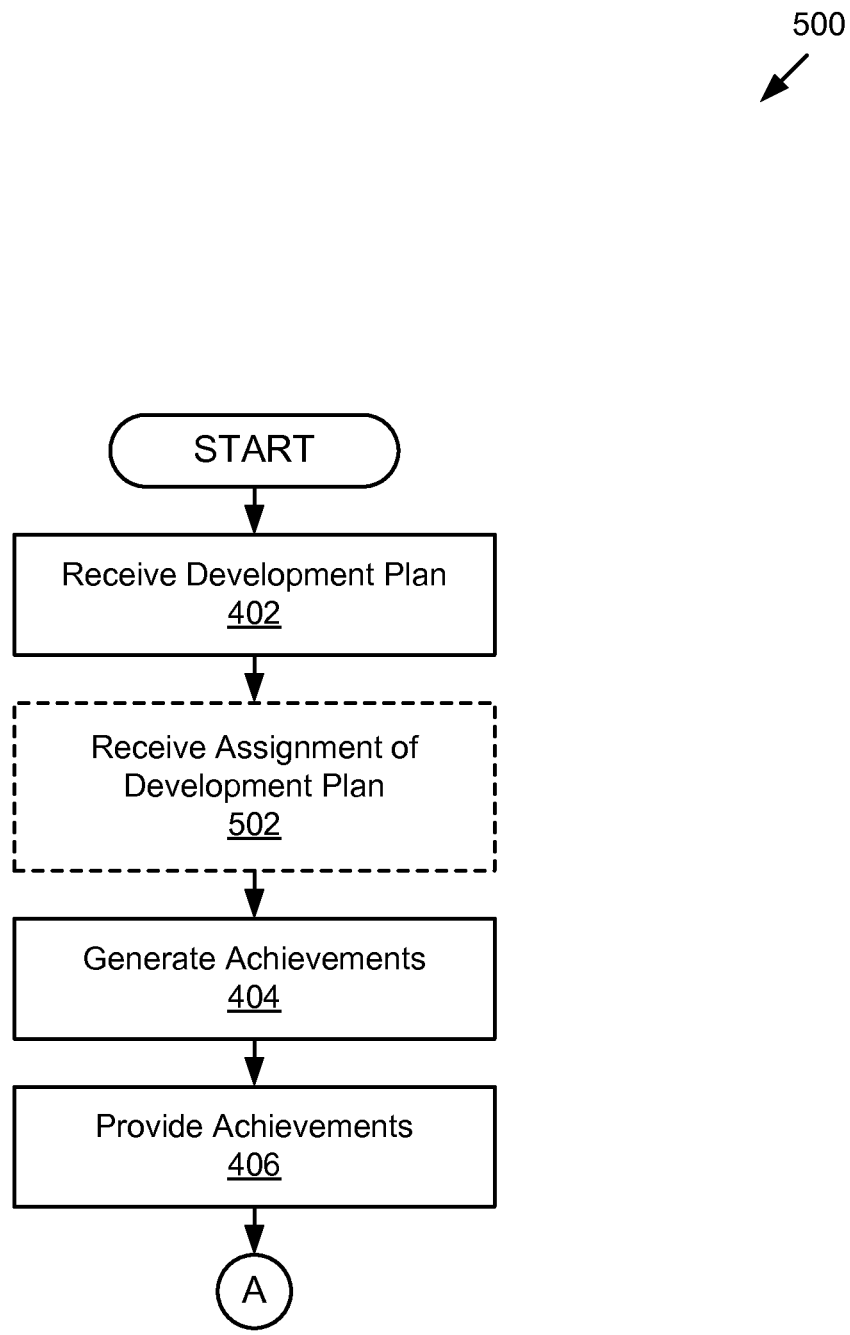
FIGS. 5A and 5B are flowcharts of an example method for managing a development plan.
Figure 5B:
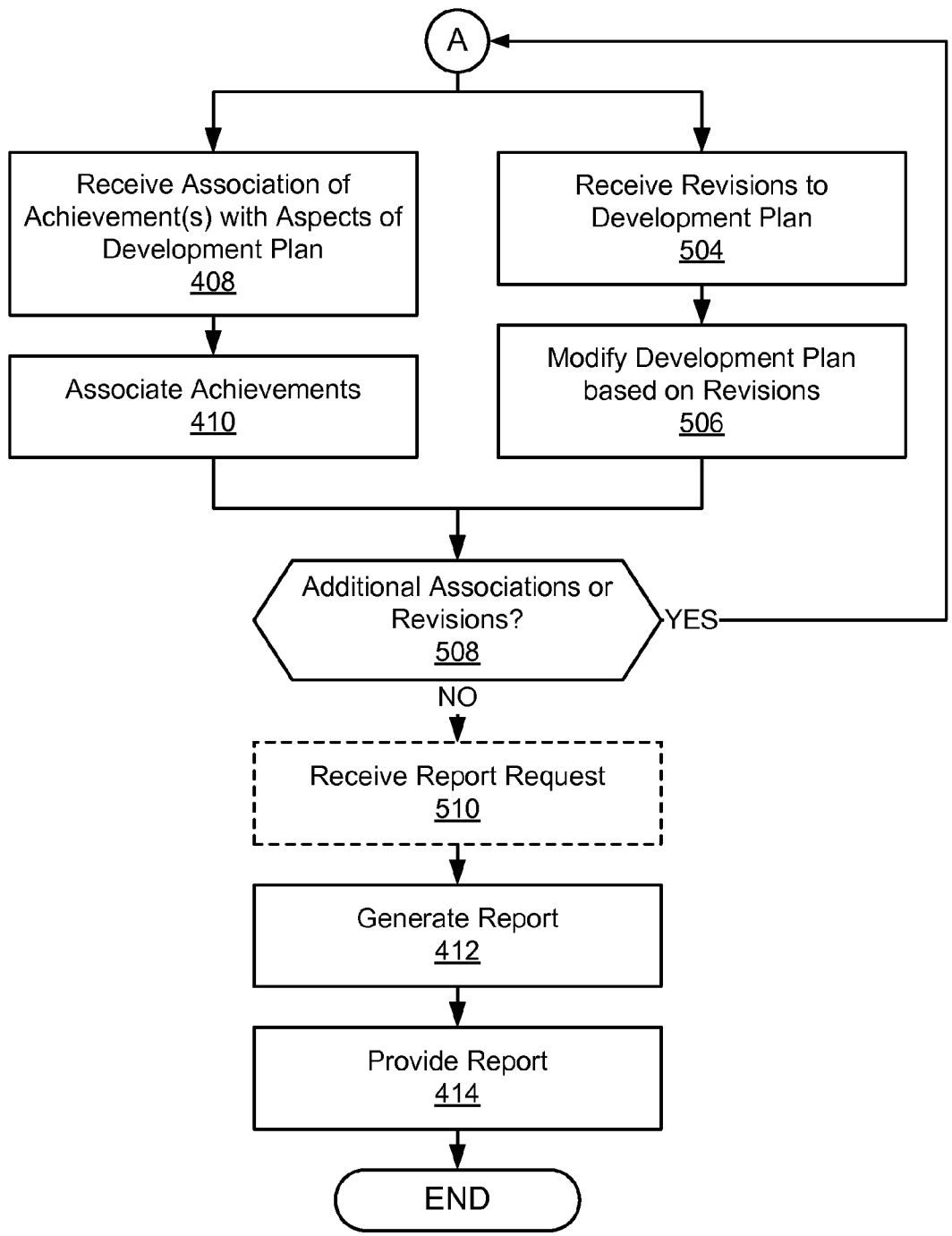

FIGS. 5A and 5B are flowcharts of an example method 500 for managing a development plan. As depicted in FIG. 5A, some of the blocks of the method 500 are the same or substantially similar to the blocks of the method 400. For convenience and ease of understanding, those blocks have the same reference numerals and perform the same or substantially similar functions, and their description will not be repeated in full here.

The method 500 begins by receiving 402 the development plan as previously described above with reference to at least block 402. Next, the method 500 continues by the plan management module 204 optionally assigning 502 the development plan to one or more other users 122. In some embodiments, assignment data is included with the development plan data received from the professional development application 302 describing which users 122 the plan should be associated with. In other embodiments, assignment data describing the users 122 that the plan should be associated with is stored and accessed from the data store 228. Additional description of an example embodiment for assigning the development plan is discussed below with reference to at least FIG. 6. In the foregoing embodiments, the plan management module 204 may annotate the development plan data with the assignment data (e.g., in the data store 228) to memorialize the assignment of the development plan to the users 122. In some embodiments, block 502 may be optional because assignment data might not be included with the development plan data or stored in the data store 228 since a user 122 may create his or her own a development plan or an administrator/user 122 may elect not to assign a development plan.

The method 500 continues by performing the functions described above with reference to at least blocks 404 and 406. Next, the plan management module 204 may receive 408 one or more associations and/or 504 development plan revisions. In some embodiments, an association (i.e., association of a user achievement with a goal, action, task, etc. included in the development plan) is received 408 in the form of association data and a development plan revision (i.e., revision/addition to the development plan) is received 504 in the form of revised or iterative development plan data. For each association received 408, the plan management module 204 can modify/annotate 410 the development plan data to reflect that association of a user achievement with an aspect (e.g., goal, action, task, etc.) of the development plan, as previously described above with reference to at least block 410. For each development plan revision received 504, the plan management module 204 can modify/annotate 506 the development plan data to reflect the revision (e.g., addition or modification of a goal) to the development plan.

Next, the method 500 can determine 508 whether there are additional associations or revisions to the development plan. If the method 500 determines that there are additional associations or revisions to the data plan, then it may return back to blocks 408 and 504 to process them, respectively. Otherwise, the method 500 may continue by the reporting module 202 receiving 510 a report request. The report request 510 may be a report instruction generated and provided by any of the entities of system 100 (e.g., 122) to the reporting module 202, or may be self-generated by the reporting module 202. The report instruction may define the scope, content, and/or recipients of the report to be generated or may simply be instruction to generate the report. Upon receiving the report instruction, the reporting module 202 may generate 412 and provide 414 the report as previously described above with reference to at least blocks 412 and 414. The method 500 is then complete and ends.

Figure 6:
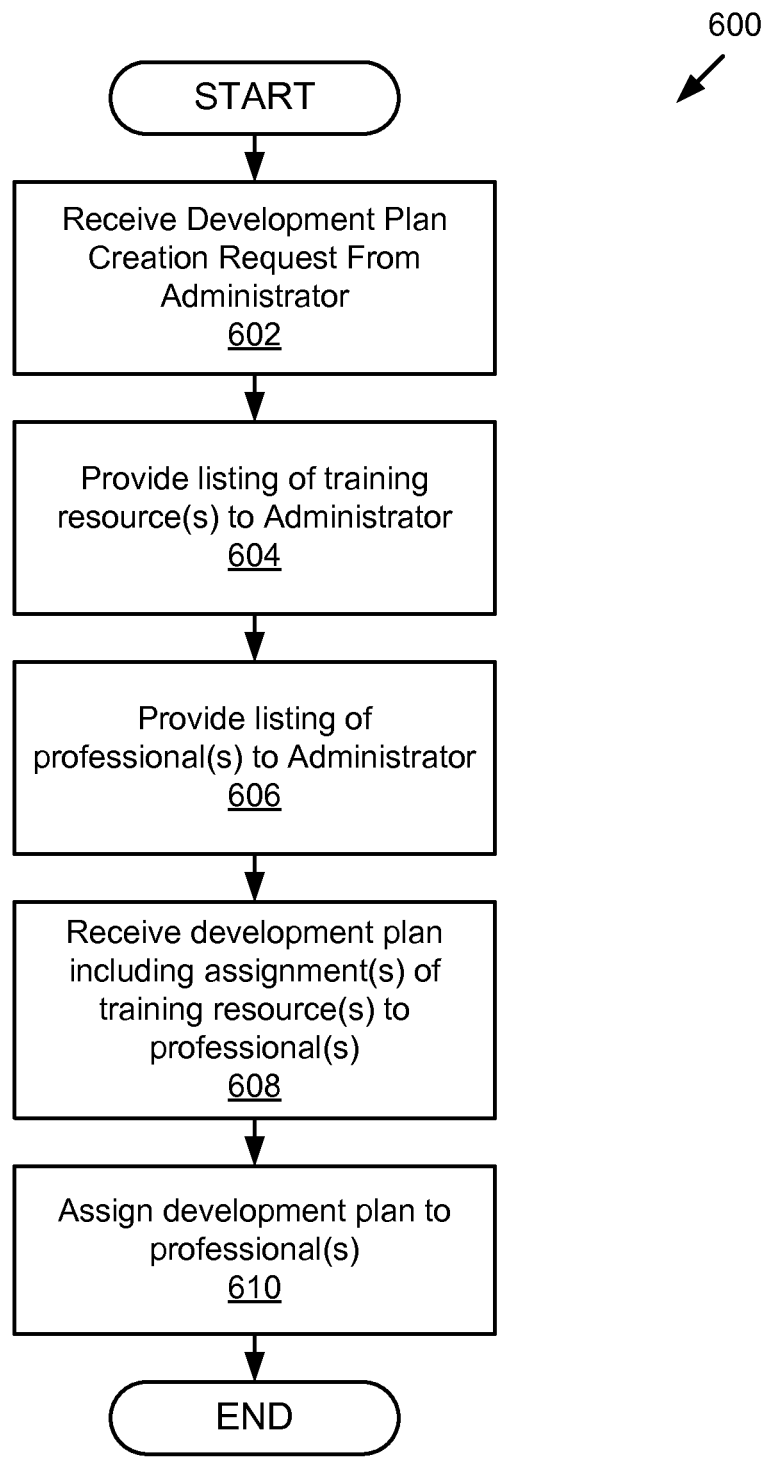
FIG. 6 is a flowchart of an example method for creating and assigning a development plan to one or more users.

FIG. 6 is a flowchart of an example method 600 for creating and assigning a development plan to one or more users. In some embodiments, the method 600 may be an expansion of one or more blocks of methods 400 and/or 500. For example, the method 600 may represent and/or include, at least in part, an expansion of blocks 402 and 502 of methods 400 and 500.

The method 600 may begin by receiving 602 a development plan creation request from an administrator/user 122. In some embodiments, the plan management module 204 may receive the development plan creation request. In other embodiments, another component of the management engine 106 or the professional development application engine 104, such as a discrete controller or request handler, may receive the request and relay it to the plan management module 204.

Responsive to receiving 602 the development plan creation request, the method 600 may provide 604 a listing of training resource(s) to the administrator. In some embodiments, the plan management module 204 may retrieve the listing of training resource(s) from the data store 228 or the professional development application engine 104 (e.g., via an API, a procedure call, etc.) and provide the listing of training resource(s) by transmitting it to a user device 118 of the administrator. In some embodiments, the administrator may, in cooperation with the professional development application 302 and/or the professional development application engine 104, instruct which training resource(s) should be provided by indicating a category or resource-type in the request, may search for and/or filter the listing of training resources, etc., to narrow the listing of training resources to his/her preferences.

The method 600 may also provide 606 a listing of professional(s) to the administrator. In some embodiments, the professional(s) may be individuals that report to the administrator or that the administrator has responsibility for. For example, in an educational environment, the administrator may be a principal or an assistant principal and the professional(s) may be teachers. In a further example, the administrator may be a district supervisor and the professional(s) may include one or more of principals, assistant principals, staff, teachers, etc. In some embodiments, the plan management module 204 may query the data store 228 for the listing of professional(s) and may provide them by transmitting them to a user device 118 of the administrator for presentation.

Responsive to providing the listing of training resource(s) and/or professional(s) the administrator, the method 600 may receive 608 a development plan including one or more assignments of one or more training resources to one or more professionals. In some embodiments, the development plan may include one or more goals that have one or more required tasks associated with them, and the tasks may be assigned to the one or more professionals for completion. In these embodiments, the required task may have one or more criteria associated with them that define the manner in which the task should be completed including, for example, any due dates, what evidence should be submitted demonstrating the performance of the task (e.g., certification, work-product, etc.). The method 600 can then assign 610 the development plan to the one or more professionals. In some embodiments, the plan management module 204 assigns a development plan by associating it with the one or more professionals in the data store 228. By virtue of assigning the development plan, any required tasks included in the development plan, along with any criteria governing the completion of those tasks, may be associated with/assigned to the one or more professionals (e.g. in the data store 228). The method 600 is then complete and ends.

Automating the creation and assignment of goal-related tasks to professionals by an administrator, as provided by way of example in method 600, carries numerous benefits. For example, in an educational environment, allows an administrator to easily define organization-wide goals for professionals to strive for as well as specific action items that must be completed by those professionals in attaining those goals. Moreover, the reporting functionality described elsewhere herein, provides the administrator with real-time, immediate access to reports that describe how the professionals are progressing relative to the aspects of the development plan. In another example, it allows an administrator to set specific goals and tasks on an individualized basis, to help facilitate growth and development among certain professionals. For example, in an educational environment, a certain teacher may be struggling with one or more aspects of his or her job related functions, and the administrator may efficiently and effectively define a development plan that includes required tasks for this teacher to perform in order to improve and ultimately become a more effective teacher. It should be understood that the foregoing examples are not exhaustive that numerous other benefits are contemplated and encompassed by the scope of the present disclosure.

Figure 7:
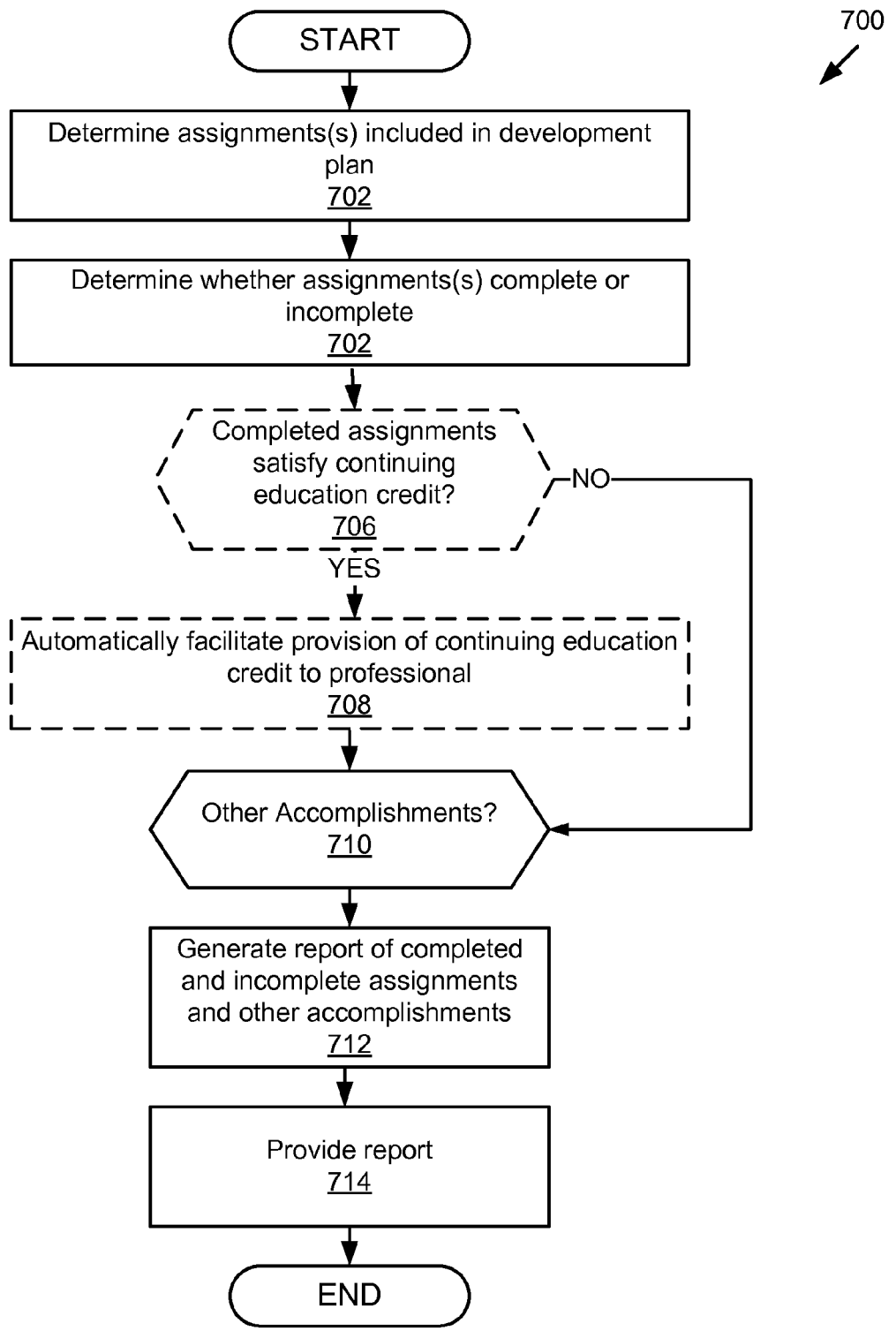
FIG. 7 is a flowchart of an example method for generating a report describing the progress one or more users have made on a development plan.

FIG. 7 is a flowchart of an example method 700 for generating a report describing the progress user(s) have made on a development plan. In some embodiments, the development plan may have been created by a user 122 and the report may be generated responsive to the reporting module 202 receiving a request for it from the user 122 or the user 122's administrator. In other embodiments, the development plan may have been created by an administrator of one or more users and assigned to them to follow (e.g., by completing the goals and assignments contained therein), and the report may be generated responsive to the reporting module 202 receiving a request for it from one of the user(s) or the administrator.

In some embodiments, the development plan may include one or more required and/or optional goal-related assignments (e.g., tasks, activities, etc.) for the user(s) to complete, and the method 700 may begin by the reporting module 202 determining 702 what assignment(s) the development plan includes and then determining 704 whether the assignment(s) have been completed by the user(s). As discussed elsewhere herein, the assignment(s) may be self-assigned or assigned by another user, such as an administrator. In some embodiments, the user(s)' achievements may be associated with the assignment(s) in the data store 228 as evidence of their completion, as discussed above with reference to at least methods 400 and 500, and the reporting module 202 may determine whether the assignment(s) are complete or incomplete based on this association data. In other embodiments, the reporting module 202 may independently compare the assignment(s) to the user(s)' achievements (videos watched, electronic books read, evidence uploaded, etc.) to determine whether the assignments have been completed. In some instances, the reporting module 202 may compare the achievement(s) to the assignment criteria (e.g., due dates, level of completion required, etc.) to determine whether assignment(s) have been completed.

By way of further example, an assignment may require that the user 122 watch a particular online training video or series of online training videos to completion within a certain timeframe. The user 122 may access and watch the assigned video(s) via the professional development application 302, and while doing so, the professional development application 302 may transmit event data describing what video(s) were watched, if the video(s) were watched to completion, and the date/time the video(s) were watched to the professional development application engine 104. The professional development application engine 104 may store the event data in the data store 228 and the achievement module 206 can compare the event data to the assignment criteria to determine if the assignment has been completed by the user, and store achievement data reflecting such in the data store 228 for use by the reporting module 202 when determining if the assignment has been completed. In other examples, the reporting module 202 may perform the comparison of event data to assignment criteria to determine if the assignment has been completed by the user.

In some embodiments, the plan management module 204 may determine 706 whether the development plan is associated with a continuing education credit and, if so, whether all the requirements of the continuing education credit have been satisfied by the completed assignments included in the development plan. If all of the requirements of the continuing education credit have been satisfied, the plan management module 204 may automatically facilitate 708 provision of the continuing education credit to the professional. For example, the third-party server 114 or the professional development application engine 104 may include software routines for managing continuing education credits/units for various certification bodies, professional societies, government boards, etc., including, for example, tracking the number of credits the users have completed, determining whether sufficient credits have been completed to maintain licensure/accreditation, etc. The plan management module 204 may facilitate provision of the continuing education credit by interacting with these entities (e.g., via APIs, procedure calls, etc.). For example, the plan management module 204 may securely transmit credit data evidencing the completion of the credit by one or more user(s) to the third-party server 114 or the professional development application engine 104, and these entities may provide the credit to the user(s) based on the credit data. The blocks 706 and 708 are depicted in hashed lines to illustrate that the operations of these blocks may, in some cases not apply, and may be omitted.

The method 700 may continue by the reporting module 202 determining 710 any other accomplishments achieved by the user 122 that are included in the development plan, generating 712 a report. In some embodiments, the report may describe the how one or more users are progressing on the development plan, as discussed elsewhere herein. For example, the report may include a summary of the items that have been completed and/or not completed by the user(s) as well as other achievements achieved by the user(s), etc. Upon generating a report, the reporting module 202 may provide 714 the report for presentation. In some embodiments, the report may be provided 714 via the network 110 for presentation to each user 122 to which the development plan applies. In some embodiments, the report may be provided via the network 110 for presentation to an administrator of the user or users 122 to which the development plan applies. The report may be presented to a user 122 via the professional development application 302, a messaging application, or other applicable software operable by the user's user device 118. The method 700 is then complete and ends.

Example User Interfaces

Figure 8A:
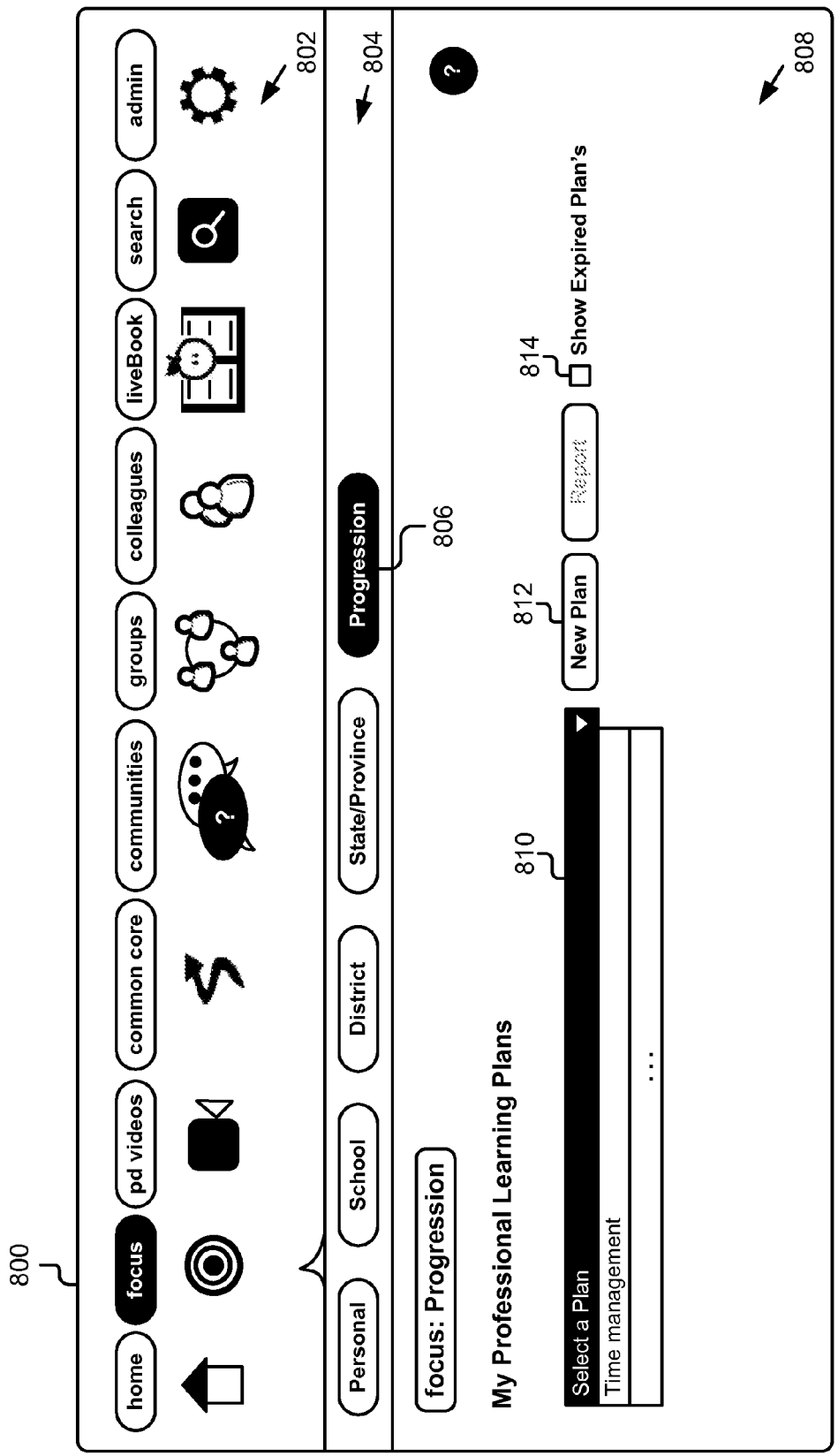

FIGS. 8A-H are graphic representations of example user interfaces for managing a development plan. In particular, FIG. 8A is a graphic representation of a user interface 800 for selecting a previously created development plan (also referred to as a professional learning plan) or for creating a new development plan. The user interface 800 may include a main navigation toolbar 802 for navigating other functionality provided by the professional development application engine 104. The user interface 800 may also include a nested navigation toolbar 804 for accessing various functionality provided by the management engine 106. In the depicted embodiment, a user 122 may select a selector 806 labeled "Progression" for instructing the professional development application 302 to generate and display a plan selection dialog 808. The plan selection dialog 808 may include a dropdown menu 810 for selecting the user's 122 previously created development plans; a new plan button 812 for creating a new development plan; and filtering options 814, such as a checkbox for showing or hiding previously created development plans that have since expired.

FIG. 8B is a graphic representation of a user interface 820 for managing a selected development plan. In some embodiments, the user interface 820 is generated and displayed by the professional development application 302 once the user 122 has selected a plan from the dropdown menu 810 displayed in FIG. 8A. The user interface 820 may include a first region 822 for displaying the contents of the development plan and a second region 824 for displaying the tasks, activities, etc. that have been accomplished/completed by the user 122. The first region 822 of the user interface 820 may include functionality for adding to, modifying, and/or deleting various aspects (e.g., goals, actions, tasks, etc.) of the development plan being viewed. For example, to add a goal, a user 122 may select the button 826 labeled "Insert Goal". This goal may serve as a folder that can receive and organize various actions (also sometimes referred to as sub-goals) and/or specific tasks (also sometimes referred to as specific or strict goals) such as those discussed further below with reference to the second region 824. To add an action, the user 122 can select the button 828 labeled "Insert Action". In some embodiments, the action indicates what action the user 122 needs to take to achieve the goal the action is nested with. In some embodiments, the user 122 may organize the actions using the goals or may define them independently from the goals. While not depicted in FIG. 8B, other buttons or editing functionality for deleting, revising or moving goals, actions, and achievements are also contemplated and within the scope of the present disclosure.

For existing development plans, the professional development application 302 may populate the first region 822 with development plan data retrieved from the plan management module 204 and the user 122 may add to or revise the development plan data using the editing functionality of the first region. The user interface 820 may also include an edit button 840 configured to initialize the user interface 830 (see FIG. 8c) and a delete button 842 for deleting the selected development plan in its entirety. In some embodiments, the user interface 820 may include an indicator 880 that indicates whether the highlighted aspect of the development plan is required or optional. For example, the development plan may be one assigned by the user's administrator and may include one or more items that the user 122 is required to complete (e.g., watching three time management videos). For these items, the user interface 820 may include an indicator indicating that the task is required.

In some embodiments, the user interface may include feedback functionality. For example, the user interface 820 may include a feedback region 872 that displays comments input by one or more users (e.g., the target user, an administrator (e.g., manager, principal, reviewer, etc.) regarding one or more aspects of the development plan. For instance, in the depicted embodiment, a principal has input a comment regarding the video watched by the user 122 and associated with the education-related action item of watching three time management videos. The feedback region 872 may include a reply button 874 for responding to the comment. For example, selecting the reply button 874 may display a text box for inputting the reply and a submit button for submitting it. In some embodiments, the feedback region 872 may include an add comment button 876 for adding a separate comment related to the highlighted element of the development plan (e.g., video). The feedback input and submitted by the user may be provided by the professional development application 302 to the plan management module 204 as development plan data for storage and later access and provision to the user 122 or other users 122, such as an administrator/user 122. The feedback region is advantageous as it can facilitate a real-time dialog between a user 122 and his/her administrator 122 regarding the development plan, and thereby enable the users to ask questions and provide and receive feedback on the development plan (e.g., answers to questions, encouragement, constructive criticism, etc.). This feedback loop can produce a higher level of engagement and interest among users on their professional development and ultimately yield more effective professionals.

Figure 8C:
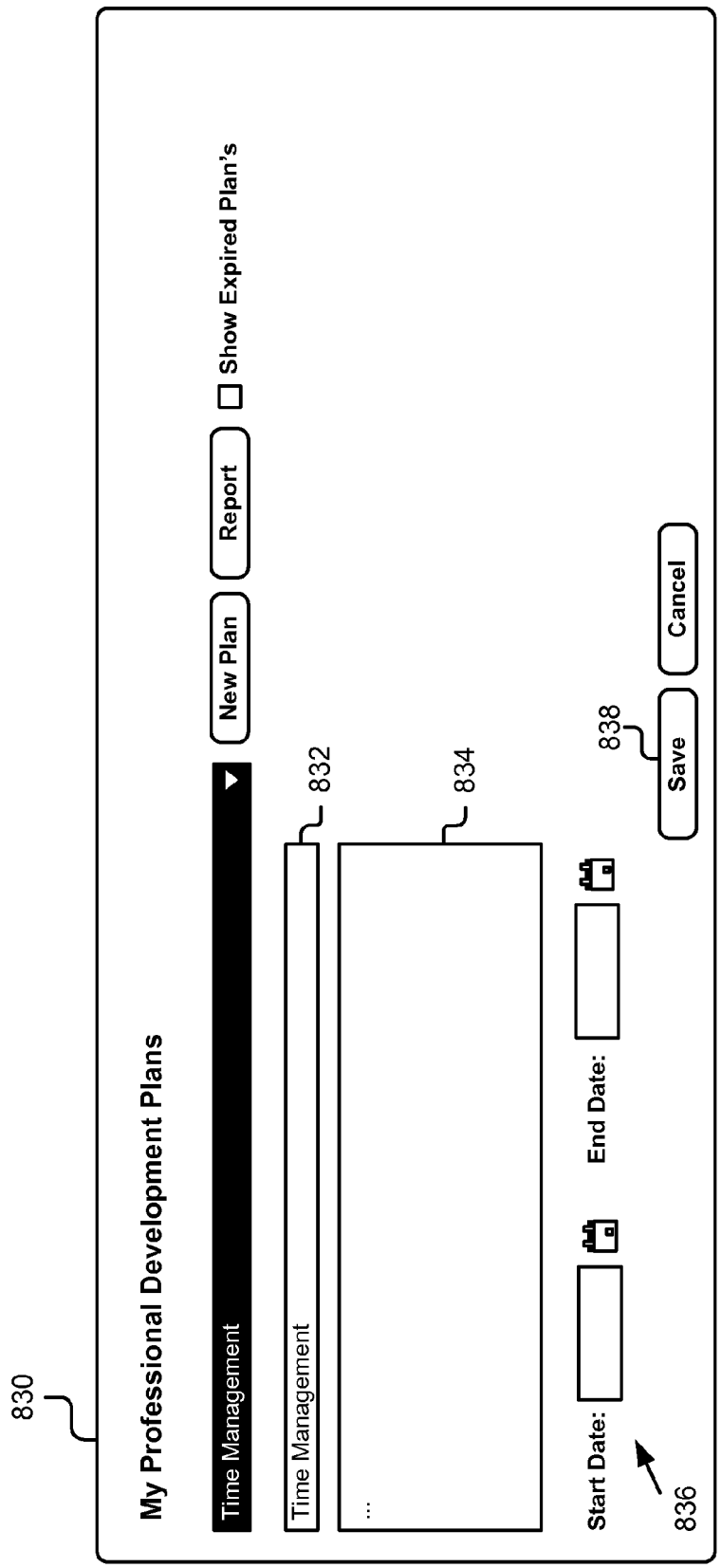

FIG. 8C is a user interface 830 for creating a new development plan according to some embodiments of the present disclosure. In some embodiments, a user 122 can create a development plan by inputting plan-related information into the user interface 830, such as a plan title 832, description 834, optionally a date range 836, and saving the development plan by selecting save 838. Once saved, the professional development application 302 may display the user interface 820 depicted in FIG. 8B so the user 122 can input goals, actions, tasks, achievements, etc.

Figure 8D:
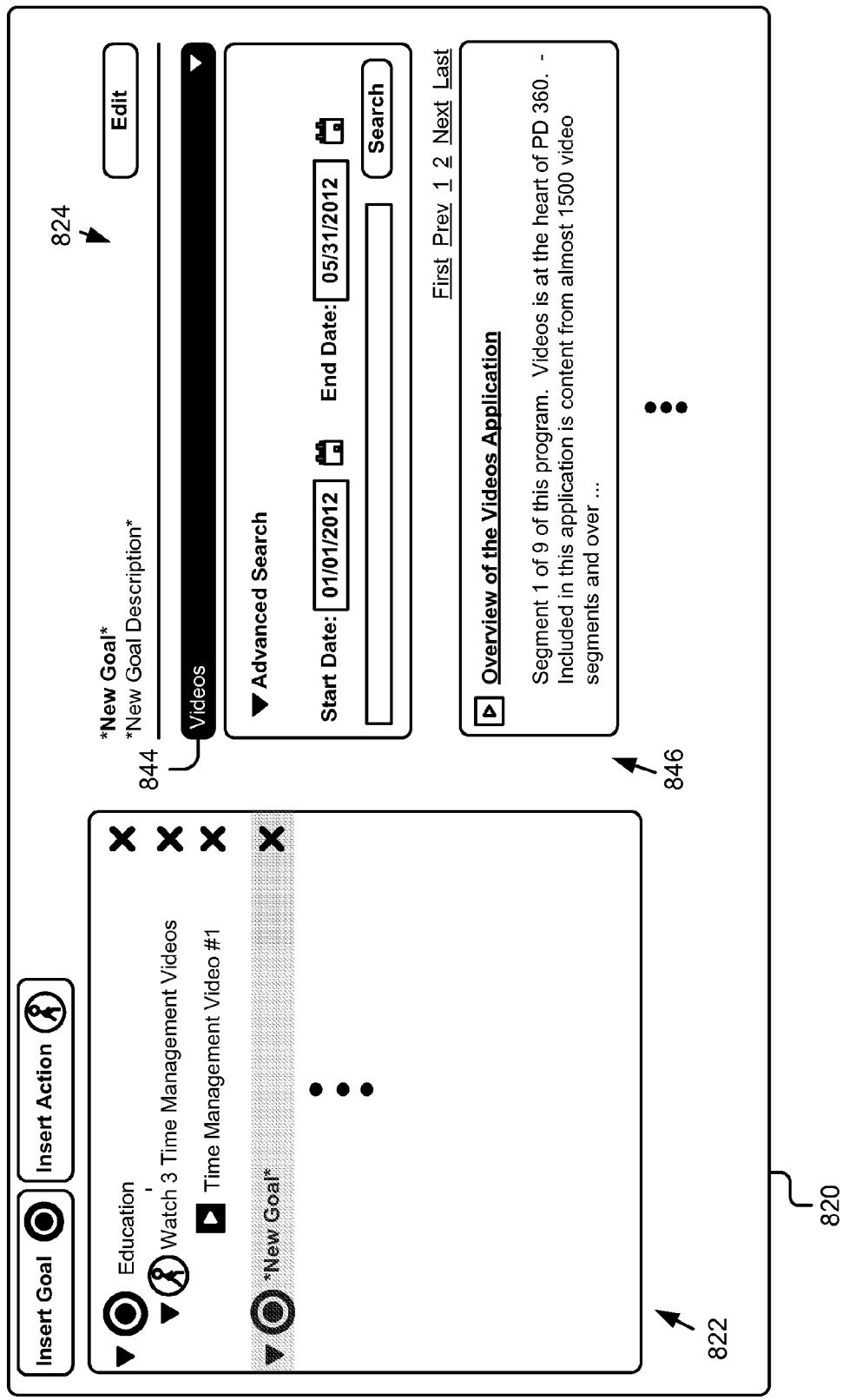

FIG. 8D is a graphic representation of the user interface 820 that includes options for a user to add and associate achievements with aspects (e.g., goals, actions, etc.) of an example development plan. In some embodiments, the second region 824 includes an achievement selector 844 for selecting achievements described by the achievement data received from achievement module 206. For example, the achievement selector can display tasks, activities, etc., that the user 122 has completed and may add to the development plan as evidence toward satisfying one or more requirements (e.g., goals, actions, etc.) of the development plan depicted in the first region 822.

Figure 8E:
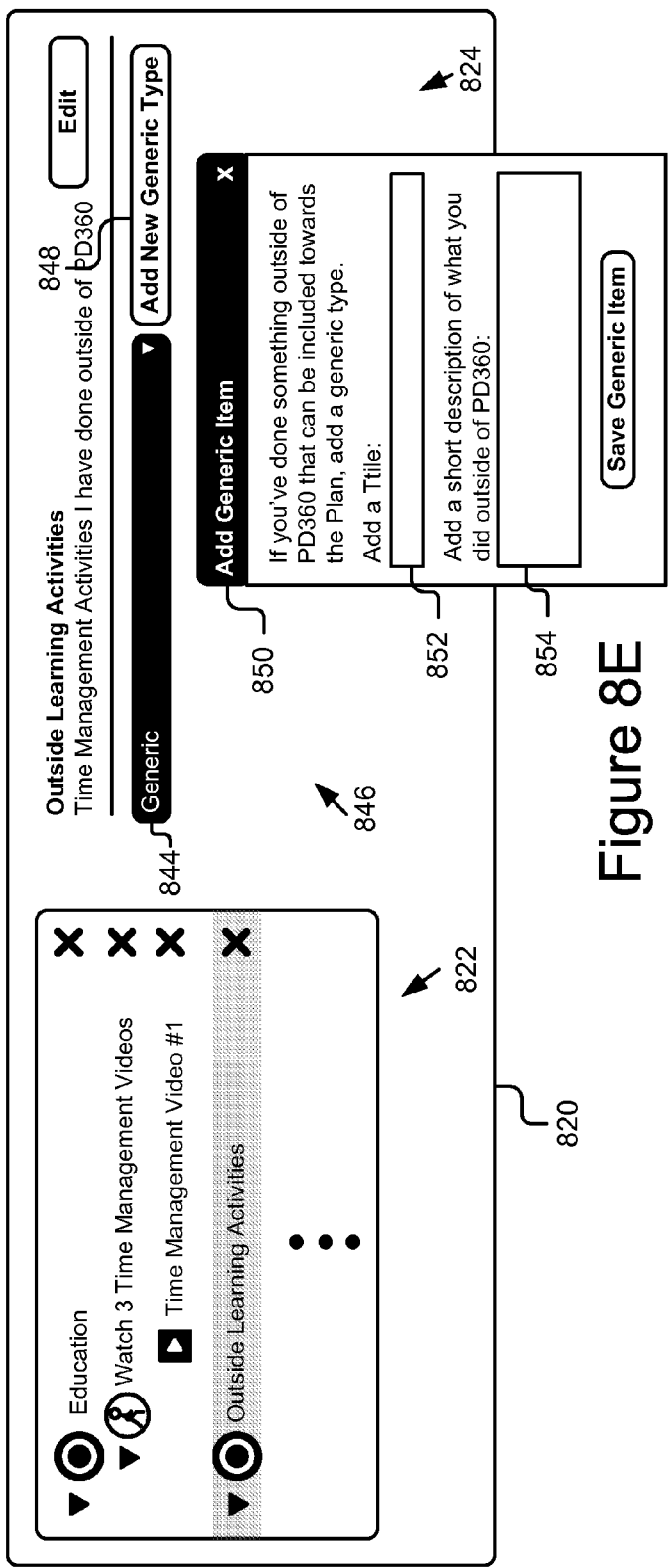
Figure 8F:
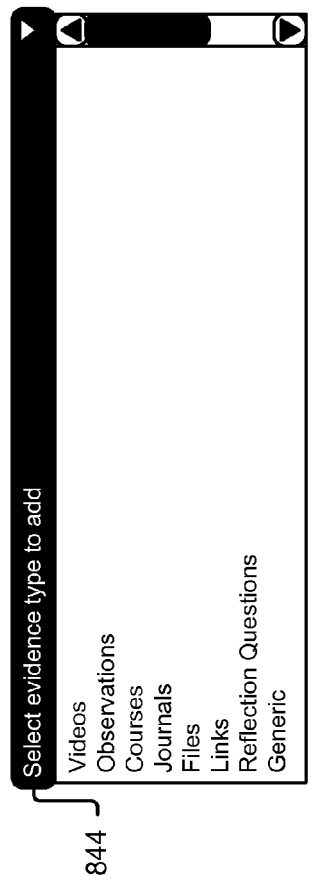

As depicted in FIG. 8F, the achievement selector 844 may be a dropdown menu including options to select video, observations, courses, journal entries, file uploads, links, reflection questions, and generic tasks/items that the users has completed. When an option from the dropdown menu is selected, the professional development application 302 can populate the content region 846 below the dropdown menu 844 depicted in FIG. 8B with corresponding tasks or items completed or provided by the user 122. For example, when "Videos" is selected in the drop-down menu 844, the content region 846 below the dropdown menu 844 may be populated by the professional development application 302 with the videos that the user 122 has watched (e.g., to completion) using the functionality provided by the professional development application engine 104 in cooperation with the professional development application 302. In some embodiments, if a user 122 has not yet watched a video that is required to be watched by a goal of the development plan, the user 122 may stream the video for watching using an instance of a video player (not shown) embedded in a top region of the user interface 800. In some embodiments, once the video has been played to completion by the user 122, the embedded video player provides a signal of such to the professional development application engine 104, and the professional development application 302 refreshes the content region 846 below the dropdown menu 844 with updated achievement data from the achievement module 206 reflecting that the video has been watched and is available to be associated with a goal folder of the development plan, as further described below.

FIGS. 8D-8F are graphic representations of example user interfaces for managing a development plan. In particular, with reference to FIGS. 8D and 8E, the user interface 820 includes a first region 822 and a second region 824 that are the same as or substantially similar to those discussed above with reference to FIG. 8C. The second (i.e., right side) region 824 may include a dropdown menu 844 that is set to select a generic item. A more detailed example view of the dropdown menu 844 is depicted in FIG. 8F. As previously described, when "Generic" is selected, the professional development application 302 may populate a content region 846 below the dropdown menu 844 with items included in the achievement data as generic items. Generic items include user-configurable items/tasks that the user 122 can create as evidence that those items/tasks were completed.

In some embodiments, the second region may include a generic task addition button 848 labeled "Add New Generic Type", which, when selected, may instruct the professional development application 302 to render and display the user interface 850. The user interface 850 is an example interface for adding additional goal-related items such as a generic item. In particular, the user interface 850 may provide interface elements for defining the generic task, such as a text boxes for inputting the title 852 and a short description 854 of the task. The functionality to add generic tasks is advantageous because it can allow a user 122 to provide evidence/a record for completed task that falls outside of the predefined categories of items/task provided by the drop down menu 844, such as videos, etc.

Figure 8G:
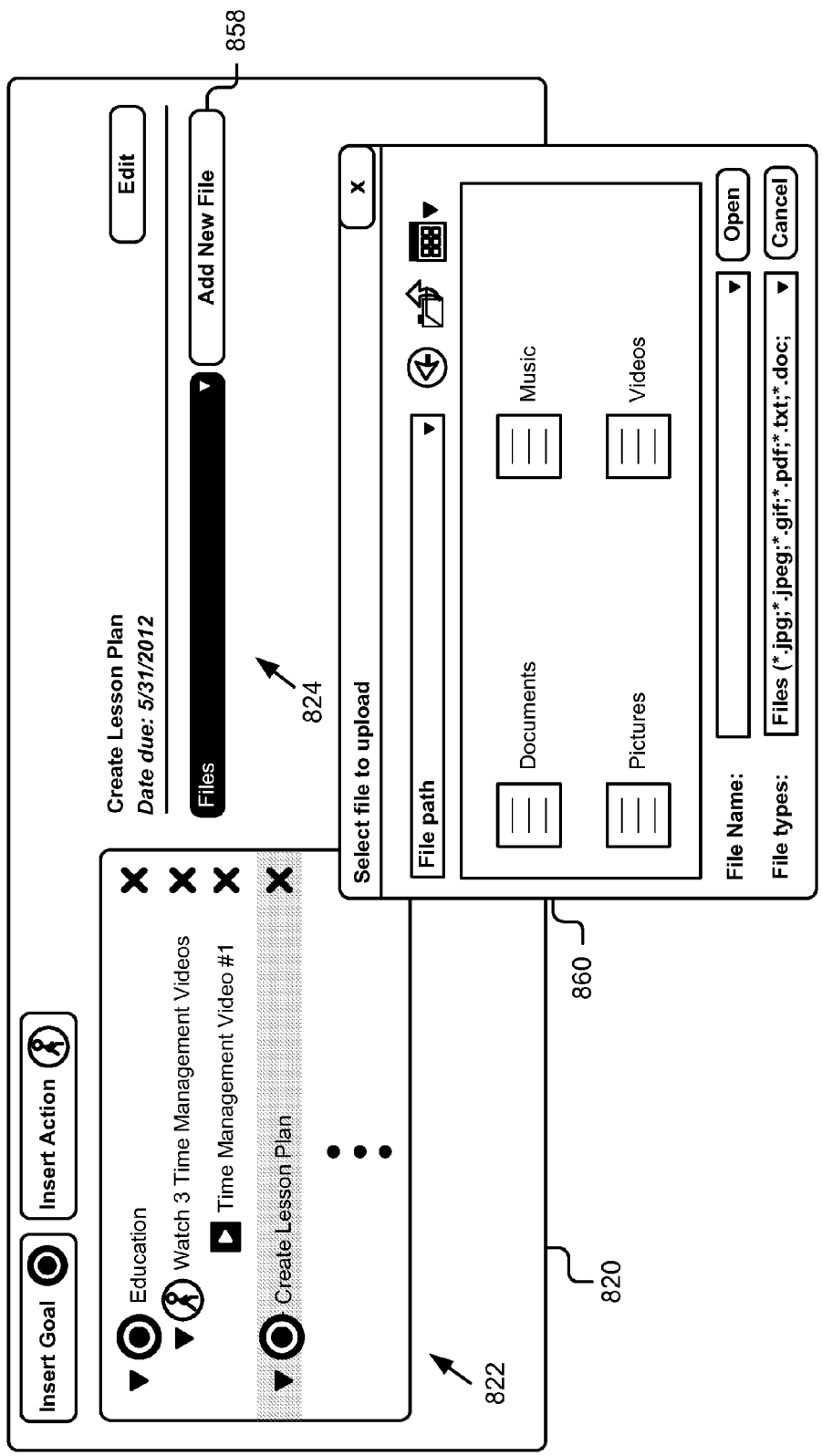

In some embodiments, the generic items can be further displayed/refined by category including, for example, conferences, workshops, and seminars attended, other tasks completed, and action undertaken. The generic items may also be coupled/associated with an uploaded file using a file addition dialog 860 functionality provided via the second region 824 (see FIG. 8G) or the user interface 850 to present a more complete picture/summary of the activity or task that was completed, and both the uploaded file and generic item may be added to the development plan as evidence that a goal was accomplished, as further described below. In other embodiments, as depicted in FIG. 8G, an uploaded file may be added using the file upload dialog 860 initialized by a new file button 858 of the user interface 820. The uploaded file may be added for selection as evidence of a completed task, for example a document establishing attendance of a conference, a document containing a lesson plan created by the user 122, etc. In the foregoing embodiments, once a file and/or generic item is added using the elements 860 and 850, the professional development application 302 may send data describing the file and/or generic item to the achievement module 206 for storage in the data store 228 as achievement data and for later retrieval during a subsequent viewing and revision of the development plan, generation of a report, etc.

Figure 8H:
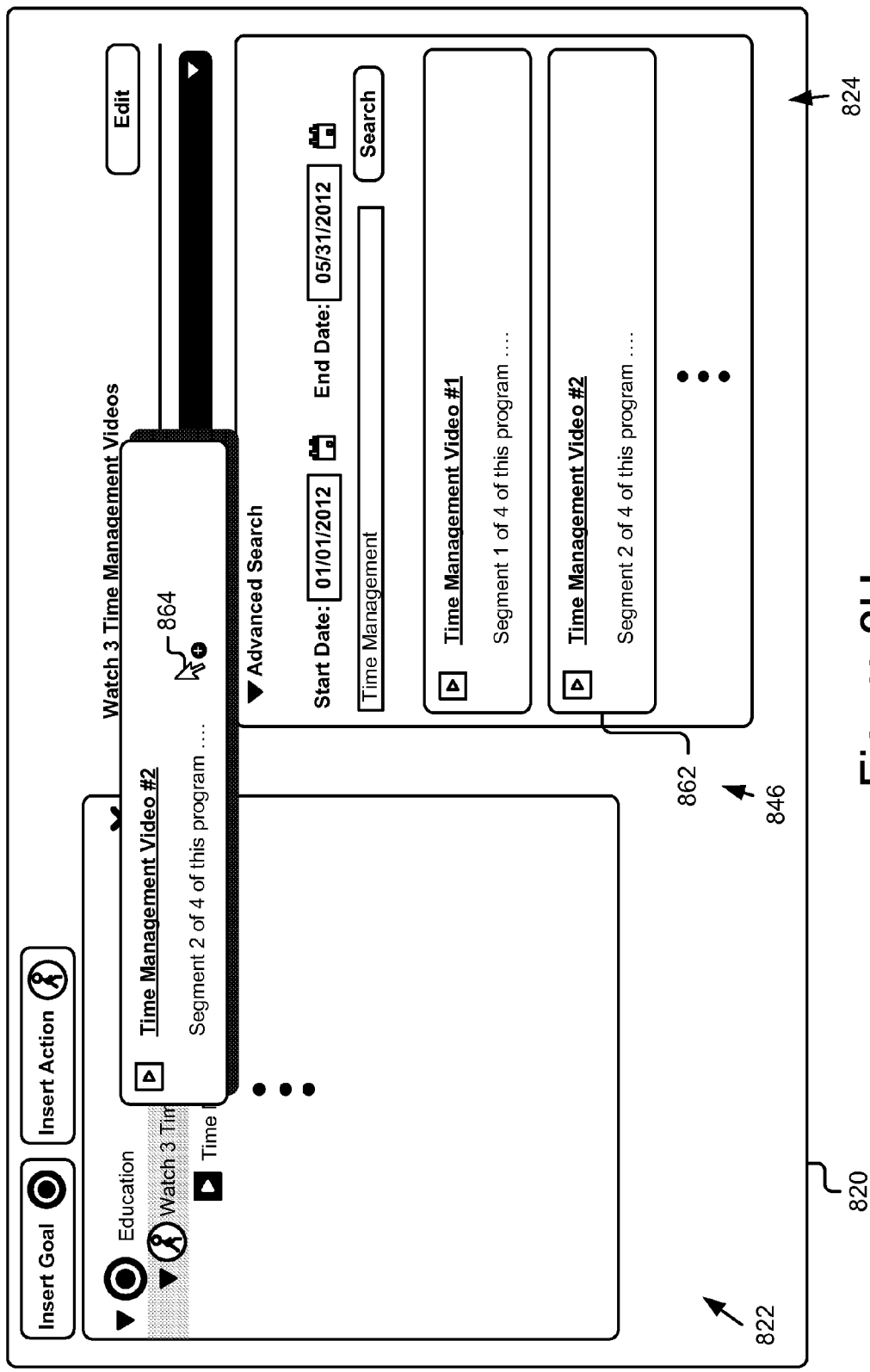

FIG. 8H is a graphic representation of the user interface 820 for managing a development plan according to some embodiments of the present disclosure. In particular, FIG. 8H depicts the association of completed tasks with aspects of the development plan. For example, the development plan may require a user 122 watch three videos on time management. The user 122 may watch the video 862 entitled "Time Management Video #2" to completion and, when the "Video" option is selected in the dropdown menu 844, the content region 846 below the dropdown menu 844 may be populated with a list of all of the videos watched by the user 122 including the video 862. In some embodiments, to associate the video 862 with the goal-related aspect (e.g., action) of the development plan requiring the viewing of it, the user 122 may drag and drop a representation of the video from the second region 824 on the aspect (e.g., action) of the development plan in the first region 822 to which the video 862 corresponds.

While FIG. 8H is described in the context of associating a completed video task with the development plan, the above-described functionality may apply to any task configured by the user 122 and/or described by the achievement data. In some embodiments, when a user 122 associates a completed task with a corresponding aspect (e.g., goal, aspect, task, etc.) using the functionality provided by the user interface 820, the professional development application 302 may generate association data describing the association to the plan management module 204 and the plan management module 204 may revise/annotate the development plan described by development plan data stored in data store 228 based on the association data received from the professional development application 302.

Figure 9A:
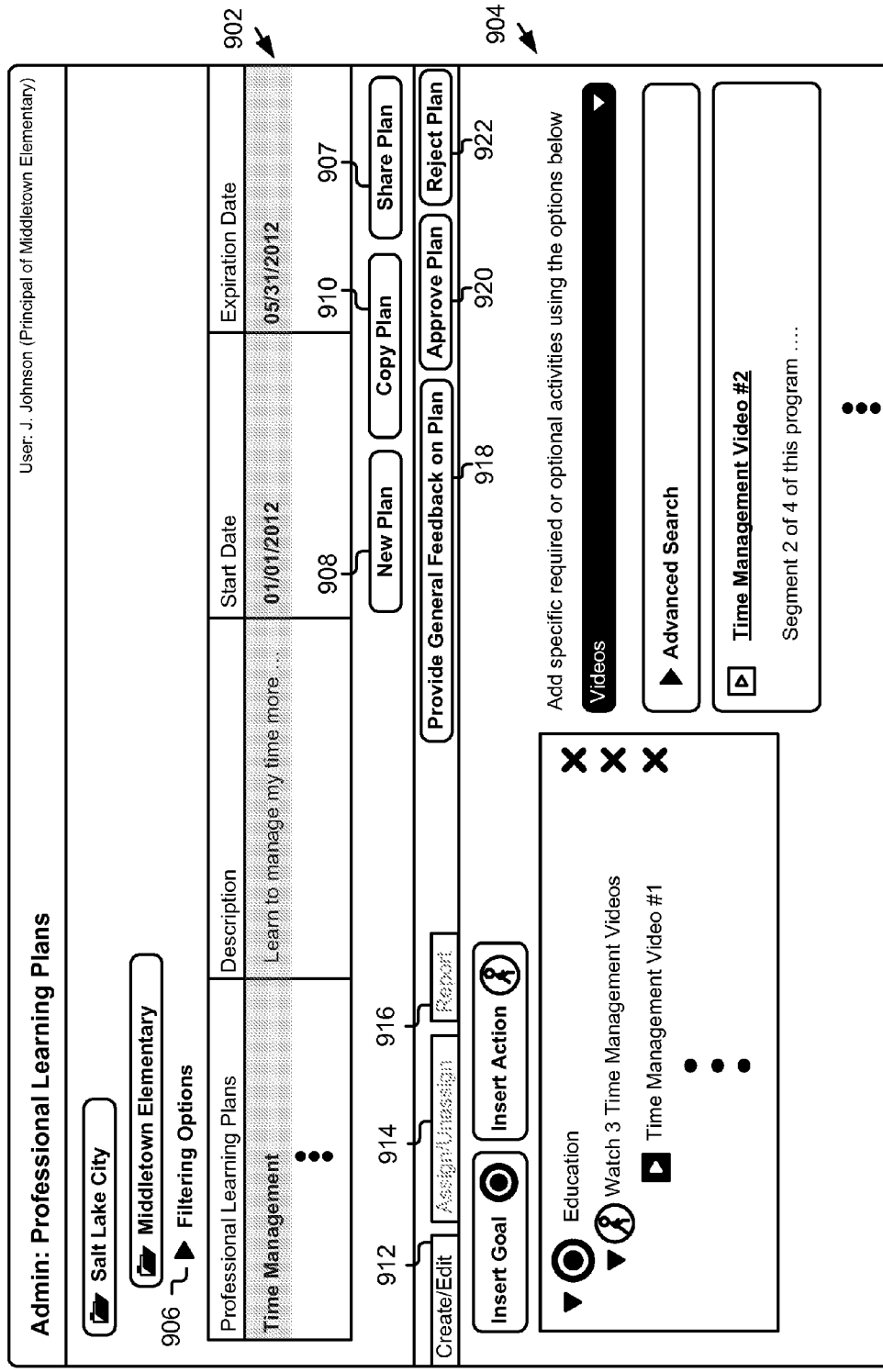
Figure 9B:
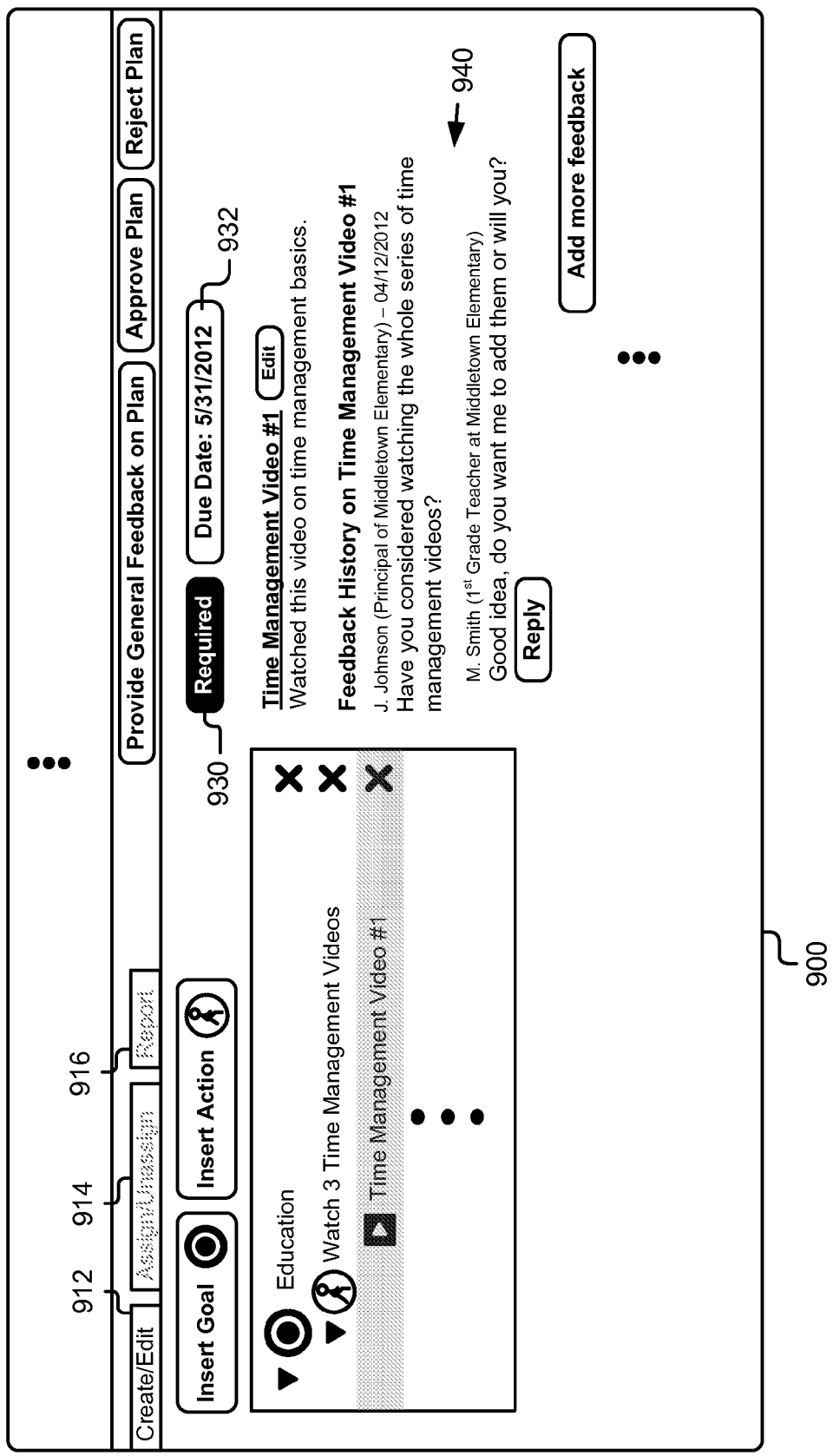

FIGS. 9A-9C are graphic representations of example user interfaces for administrating development plans. In particular, as depicted in FIG. 9A, an example user interface 900 may include a list region 902 for listing existing development plans, and a display region 904 for displaying development plans selected in the list region 902. In the depicted embodiment, the list region 902 may be displayed above the display region 904 for convenience in selecting and working with various different development plans, however, the regions 702 and 704 may be situated vertically adjacent, may be combined, or may have other configurations.

In some embodiments, the list region 902 may include filtering elements 906 for filtering the development plans shown in the list region 902. For example, an administrator/user 122 who administrates a number of districts and schools, may instruct the professional development application 302 to narrow the development plans listed in the list region 902 by selecting a specific district, school, and or filtering out any inactive schools or schools no longer administrated by the administrator/user 122. In some embodiments, each development plan may include metadata describing the district, school, teacher, principal, administrator, etc. that it is associated with, and the filtering performed by the professional development application 302 and/or the plan management module 204 may compare the metadata to data associated with the administrator/user 122 to determine if the development plan should be shown in the list region 902. In some embodiments, the data associated with the administrator/user 122 is information included user account data, such as district and school information, which is stored in and accessed from the data store 228 by the professional development application 302 and/or the plan management module 204.

In some embodiments, the user interface 900 may include elements such as a new plan button 908 and a copy plan button 910 for creating a template development plan. The template development plan may be created from scratch or may be copied from a previously created development plan displayed in the list region 902. The list view may also include default plan templates provided by the plan management module 204. The default plan templates may reflect development plans that are commonly used, such as a new teacher template, an elementary math template, etc., or may be training templates for learning to use various tools and functionality of the professional development application 302, the professional development application engine 104 and/or management engine 106. In some embodiments, the administrator may copy a default plan template to create a new plan. The user interface 900 may also include a share button 907 for sharing a plan created by the user 122 with one or more other users. For example, a user/administrator 122 may have created a plan that has proven to be particularly effective and may share that plan with other users 122 for them to use and/or assign to those that they oversee. It should be understood that the development plans may be shared between any combination of users 122 and/or administrator/users 122.

In the depicted embodiment, the display region 904 includes a tab 912 for creating and/or editing the development plan highlighted in the list region 902, a tab 914 for assigning/unassigning the development plan(s) highlighted in the list region 902, and a tab 916 for reporting on the development plan highlighted in the list region 902. In some embodiments, a development plan may be created by an administrator/user 122 that oversees one or more other users 122 and then assigned to those users 122 to track their progress (e.g., relative to the goals defined therein). As depicted in FIGS. 9A and 9B, when the tab 912 is selected, the display region 904 may include functionality that is the same or substantially similar to the user interfaces described in reference to FIGS. 8A-8H. In the interest of brevity, this functionality will not be repeated here. The administrator/user 122 may use the functionality of the user interfaces 820, 830, 900, etc., to create and/or edit a development plan. In some embodiments, the display region 904 includes elements managing a plan created by a user that he/she oversees. For example, the display region 904 may include a general feedback button 918 that is selectable to input and submit general feedback about a plan, an approval button 920 for approving a plan created by a subordinate user 122, and a rejection button 922 for rejecting a plan created by a subordinate user 122.

When creating or editing a development plan, the administrator/user 122 may define a time period for when the various items (e.g., goals, actions, tasks, etc.) of the development plan should be completed. For example, as depicted in FIG. 9B, the user interface 900 may include a date selector 932 for inputting the date for when one or more of the goals, action items, and specific tasks included in the development plan are due. The user interface 900 may also include a required button 930 for defining whether one or more of the goals, action items, and specific tasks are required. In some embodiments, the items of the development plan may be set as required on an individualized basis or the user interface may include a user interface element for setting all aspects of the development plan as required.

While not depicted, when tab 914 is selected, the display region 904 may include elements for assigning or unassigning the development plan selected in the list region 902. For example, the display region 904 may include the names of the users that are overseen, managed, etc., by the administrator/user 122 with options to select and assign the development plan to one or more of them. In some embodiments, the display region may automatically be populated with a list of identifiers representing the users 122 that the administrator/user 122 manages, and the administrator/user 122 may select and unselect users 122 from that list. When the users 122 to which the development plan is assigned is changed using the functionality described above, the professional development application 302 may send assignment data describing those changes to the plan management module 204 for updating the development plan data stored in data store 228. In some embodiments, once a development plan is assigned, only the administrator/user 122, or other users given permission by the administrator 122/user, may modify the development plan. In these embodiments, a user 122 being overseen or managed by the administrator/user 122 may add additional aspects (e.g., goals, actions, tasks, etc.), as well as associated achievements, to supplement the underlying development plan created by the administrator/user 122 and then shared with the administrator/user 122. By way of further example, a chief school administrator may oversee several districts and may broadcast various plans over the entire district for assignment to and use by the administrators and teachers in those districts.

When tab 916 is selected, the display region 904 may include a report region (not shown) for requesting that a report be generated for a given development plan by the reporting module 202 of the management engine 106. While not depicted, the report region may include a button that, when selected, instructs the professional development application 302 to generate and send a report instruction to the reporting module 202, instructing the reporting module 202 to generate and provide the report. In some embodiments, the report may be generated and provided directly to the requesting user 122 for download, for example as a portable document such as a PDF, or via a web-based interface generated by the application development engine. In these or other embodiments, the report may be attached to an electronic message (e.g., email, text message, etc.) or included directly in the message and sent to one or more electronic addresses selected and/or provided by the requesting user 122. The report may be distributed via any electronic messaging system such as email, text message, an internal messaging system of the professional development application engine 104, an external electronic messaging system provided by a third-party server 114, etc. While the above reporting functionality is described with reference to an administrator/user 122, it is also contemplated that the above-described report region may be displayed in the user interface 820, or any other user interface generated by the professional development application 302, and may provide any user 122 the ability to have reports generated for development plans associated with his or her user account. In some cases, the user 122 may then forward the report to an administrator user 122 and/or keep the report for his/her records.

As depicted in FIG. 9C, in some embodiments, a report may be embodied by a user interface 980 that displays the development plans associated with an administrator/user 122 and the progress of the each of the users 122 associated with those development plans. The user interface 980 may include a plan selection region 950 for selecting and/or filtering the development plans, a user region 952 for displaying and selecting the users associated with the development plan highlighted in the plan selection region 950, and a detail region 940 for displaying the progress of the user 122 and providing feedback on the development plan or various aspects thereof.

The plan selection region 950 may include an element for opening and editing a given development plan (e.g., see FIG. 9A) and information about the development plan including a description of the plan, the creator of the plan, the start and expiration dates associated with the development plan, etc. In some embodiments, selecting the creator's name opens an interface for viewing that user 122's profile and/or activity on the professional development application, messaging the user 122, etc.

The user region 952 may include information about each of the users 122 associated with the development plan highlighted using the plan selection region 950. For example, an administrator/user 122 may select a plan (e.g., a row of the table) in the plan selection region 950 and the user region 952 may be refreshed with information about the users 122 associated with (e.g., assigned to) the selected plan, as provided by the management engine 106. This information may include, for each user 122, that user's name 956, an indication 958 of that user's progress on the development plan, a button for initializing a messaging interface for sending the user 122 an electronic message. The user region 952 may also include an edit button 954 for editing the users 122 that are associated (e.g., assigned to) the selected development plan. For example, selecting the edit button may display a dialog that includes functionality for assigning users 122 to or unassigning users 122 from the development plan, as discussed above with reference to tab 914.

The detail region 940 may include the details of the development plan as well as status indicators 960 and 962 that reflect whether the user 122 has satisfied the requirements of the development plan. For example, as depicted in FIG. 9C, the detail region 940 may include a status indicator 960 showing that the user 122 has not yet completed watching three time management videos and a status indicator 962 that the user 122 has completed one of the videos. In some embodiments, the detail region 940 may also include the feedback functionality described above with reference to FIG. 8B, thus allowing the user 122 and the administrator 122 to easily and conveniently discuss the development plan and the user's progress therewith.

Figure 10:
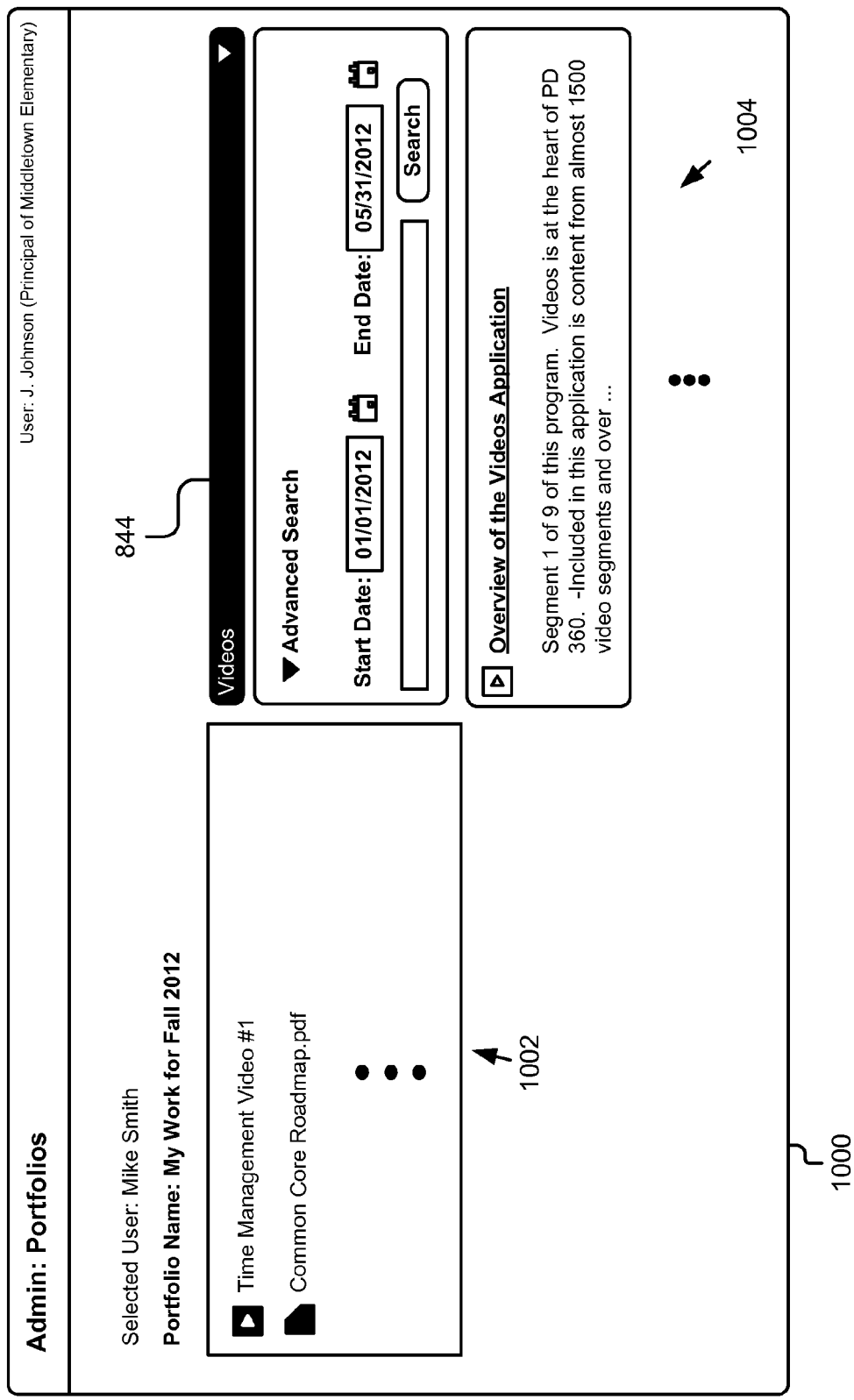
FIG. 10 is a graphic representation for managing a user portfolio of achievements.

FIG. 10 is a graphic representation of an example user interface 1000 for managing a user portfolio of achievements. In the depicted embodiment, the user interface includes a portfolio region 1002 and an achievement region 1004. The portfolio region 1002 contains portfolio items that have been input by the user. These items, which reflect the user's achievements, may be added to the achievement region 1004 by selecting and dragging and dropping them in to the achievement region 1004 in a manner substantially similar to that described above with reference to FIGS. 8B-8I. For example, the achievement region may include the achievement selector 844 and filtering elements for determining the user's achievements and the user 122 may drag and drop one or more of these achievements into the portfolio region 1002 to create a virtual portfolio of his/her accomplishments.

While not depicted, the achievement region may also include the feedback functionality described above with reference to FIG. 8B so the user 122 and his/her administrator(s) 122 to discuss various aspects of the portfolio. In some embodiments, the portfolio region may include functionality for sorting and/or arranging the items defined therein. For example, the portfolio region may allow a user 122 to define the items in a particular order or may provide the user 122 the option to automatically sort the items according to type, completion date, and/or a variety of other attributes. In some embodiments, the associations, feedback, and portfolio input by the user 122 may be provided by the professional development application 302 to the plan management module 204 as portfolio data for storage in the data store 228 and later use and provision/sharing by the plan management module 204.

Using the portfolio functionality provided by the professional development application 302 in cooperation with the management engine 106, a user 122 may create any number of portfolios having any number of achievements. For example, additional portfolio-related interfaces may be rendered and displayed by the professional development application 302 that display all of the user's portfolios and sharing functionality (e.g., a sharing button, user selector, etc.) to select the portfolio he/she wishes to share as well as the users that he/she wishes to share the portfolio with. This is advantageous as users can use this functionality to create and share a portfolio of accomplishments with an administrator to demonstrate what efforts the user 122 has made to improve over a period of time, and the administrator can consider this portfolio when doing a formal evaluation of the user's performance (e.g., for a promotion, annual review, etc.).

It should be understood that the user interfaces described in FIGS. 8A-10 are merely examples and that the interface elements may have a variety of distinct formats, positions within the window, and combinations, all of which are encompassed by the scope of the present disclosure. Moreover, numerous additional interfaces and interface configurations are contemplated and encompassed by the scope of this disclosure.

In the above description, for purposes of explanation, numerous specific details are set forth in order to provide a thorough understanding of the disclosure. It should be understood that the technology described in the various example embodiments can be practiced without these specific details. In other instances, structures and devices were shown in block diagram form in order to avoid obscuring the disclosure. For example, the present disclosure was described in some embodiments above with reference to user interfaces and particular hardware. However, the present disclosure applies to any type of computing device that can receive data and commands, and any devices providing services, and it should be understood that the present disclosure applies to any type of network-based service including communication between endpoints.

Reference in the specification to "some embodiments" or "an embodiment" means that a particular feature, structure, or characteristic described in connection with the embodiment(s) is included in at least one embodiment of the disclosure. The appearances of the phrase "in some embodiment" in various places in the specification are not necessarily all referring to the same embodiment(s).

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The disclosure can take the form of an entirely hardware embodiment, an entirely software embodiment or an embodiment containing both hardware and software elements. In a preferred embodiment, the disclosure is implemented in software, which includes but is not limited to firmware, resident software, microcode, etc.

Furthermore, the disclosure can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, Wi-Fi™ adapters, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description above. In addition, the present disclosure is not described with reference to any particular programming language. It will be appreciated that a variety of programming languages may be used to implement the teachings of the disclosure as described herein.

It is intended that the scope of the disclosure be limited not by this detailed description, but rather by the claims of this application. As will be understood by those familiar with the art, the present disclosure may be embodied in other specific forms without departing from the spirit or essential characteristics thereof. Likewise, the particular naming and division of the modules, routines, features, attributes, methodologies and other aspects are not mandatory or significant, and the mechanisms that implement the present disclosure or its features may have different names, divisions and/or formats. Furthermore, it should be understood that the modules, routines, features, attributes, methodologies and other aspects of the disclosure can be implemented as software, hardware, firmware or any combination of the three. Also, wherever a component, an example of which is a module, of the present disclosure is implemented as software, the component can be implemented as a standalone program, as part of a larger program, as a plurality of separate programs, as a statically or dynamically linked library, as a kernel loadable module, as a device driver, and/or in every and any other way. Additionally, the disclosure is in no way limited to implementation in any specific programming language, or for any specific operating system or environment. Accordingly, the disclosure is intended to be illustrative, but not limiting, of the scope of the subject matter set forth in the following claims.

What is claimed is:

1. A computer-implemented method comprising:
receiving, by one or more computing devices, a development plan for one or more users, the development plan including a goal-related aspect associated with a profession;
automatically determining, by the one or more computing devices, one or more achievements as being achieved by querying a data store for the one or more achievements and comparing an aspect of the one or more achievements with a completion criteria, the one or more achievements reflecting one or more activities performed by a first user to fulfill the goal-related aspect of the development plan;
providing for display, by the one or more computing devices, the one or more achievements automatically determined as being achieved to a user device of the first user;
responsive to providing for display the one or more achievements, receiving, by the one or more computing devices, an association from the first user of an achievement selected from the one or more achievements automatically determined as being achieved with the goal-related aspect of the development plan; and associating, by the one or more computing devices, the achievement with the goal-related aspect of the development plan responsive to receiving the association of the achievement.

2. The computer-implemented method of claim 1, comprising:
generating, by the one or more computing devices, a report describing the progress of the first user on the development plan based on associating the achievement with the goal-related aspect of the development plan; and
providing for display, by the one or more computing devices, the report to the user device of the first user or a user device of a second user that is an administrator of the first user.

3. The computer-implemented method of claim 1, comprising:
receiving, by the one or more computing devices, an assignment of the development plan from a second user that is an administrator of the first user; and
assigning, by the one or more computing devices, the development plan to the first user for completion.

4. The computer-implemented method of claim 1, comprising:
receiving, by the one or more computing devices, feedback from a second user regarding one or more of the goal-related aspect and the achievement, the second user being an administrator of the first user; and
providing for display, by the one or more computing devices, the feedback from the second user to the first user.

5. The computer-implemented method of claim 4, comprising:
receiving, by the one or more computing devices, a revision to the development plan based on providing the feedback for display, wherein the revision includes one or more of adding, modifying, and deleting one or more of a goal, an action, and a task of the development plan.

6. The computer-implemented method of claim 1, comprising:
providing for display, by the one or more computing devices, a listing of one or more training resources to a user device of a second user that is an administrator of the first user; and
providing for display, by the one or more computing devices, a listing of one or more professionals including the first user to the user device of the second user, wherein the development plan is received from the second user and includes an assignment of a training resource to one or more of the professionals including the first user for completion within a certain timeframe.

7. The computer-implemented method of claim 6, comprising:
assigning, by the one or more computing devices, the development plan to the first user for completion.

8. The computer-implemented method of claim 1, comprising:
determining, by the one or more computing devices, an assignment for the first user included in the development plan;
automatically determining, by the one or more computing devices, a status for the assignment, the status describing whether the assignment has been completed by the first user;
generating, by the one or more computing devices, a report including the status; and providing for display, by the one or more computing devices, the report to a second user for review, the second user being an administrator of the first user.

9. The computer-implemented method of claim 1, comprising:
determining, by the one or more computing devices, an assignment for the first user included in the development plan;
automatically determining, by the one or more computing devices, the assignment to be complete; and
automatically facilitating, by the one or more computing devices, provision of a continuing education credit to the first user based on determining the assignment to be complete.

10. The computer-implemented method of claim 1, wherein the one or more activities performed by the first user to fulfill the goal-related aspect of the development plan include one or more of watching a video on a professional topic, responding to feedback received from a second user that is an administrator of the first user, completing course work, submitting a journal entry on certain subject, and interacting with one or more other users in a community discussion.

11. The computer-implemented method of claim 1, wherein the completion criteria includes requiring the one or more achievements to satisfy one or more of a due date, a predetermined level of completeness, a predetermined level of engagement, a predetermined level of difficulty, and a predetermined topic.

12. The computer-implemented method of claim 1, wherein the development plan is sharable by a third user with a second user, the development plan is assignable by the second user to the one or more users, and the second user and the third user are administrators of the one or more users.

13. A computer program product comprising a non-transitory computer-usable medium including instructions which, when executed by a computer, cause the computer to:
receive a development plan for one or more users, the development plan including a goal-related aspect associated with a profession;
automatically determine one or more achievements as being achieved by querying a data store for the one or more achievements and comparing an aspect of the one or more achievements with a completion criteria, the one or more achievements reflecting one or more activities performed by a first user to fulfill the goal-related aspect of the development plan;
provide for display the one or more achievements automatically determined as being achieved to a user device of the first user;
responsive to providing for display the one or more achievements, receive an association from the first user of an achievement selected from the one or more achievements automatically determined as being achieved with the goal-related aspect of the development plan; and
associate the achievement with the goal-related aspect of the development plan responsive to receiving the association of the achievement.

14. The computer program product of claim 13, wherein the instructions further cause the computer to:
generate, a report describing the progress of the first user on the development plan based on associating the achievement with the goal-related aspect of the development plan; and provide, for display, the report to the user device of the first user or a user device of a second user that is an administrator of the first user in the profession.

15. The computer program product of claim 13, wherein the instructions further cause the computer to:
receive an assignment of the development plan from a second user that is an administrator of the first user; and
assign the development plan to the first user for completion.

16. The computer program product of claim 13, wherein the instructions further cause the computer to:
receive feedback from a second user regarding one or more of the goal-related aspect and the achievement, the second user being an administrator of the first user; and
provide for display the feedback from the second user to the first user.

17. The computer program product of claim 16, wherein the instructions further cause the computer to:
receive, based on providing the feedback for display, a revision to the development plan, the revision including one or more of adding, modifying, and deleting one or more of a goal, an action, and a task of the development plan.

18. The computer program product of claim 13, wherein the instructions further cause the computer to:
provide for display a listing of one or more training resources to a user device of a second user that is an administrator of the first user; and
provide for display a listing of one or more professionals including the first user to the user device of the second user, wherein the development plan is received from the second user and includes an assignment of a training resource to one or more of the professionals including the first user for completion within a certain timeframe.

19. The computer program product of claim 18, wherein the instructions further cause the computer to:
assign the development plan to the first user for completion.

20. The computer program product of claim 13, wherein the instructions further cause the computer to:
determine an assignment for the first user included in the development plan;
automatically determine a status for the assignment, the status describing whether the assignment has been completed by the first user;
generate a report including the status; and
provide for display the report to a second user for review, the second user being an administrator of the first user.

21. The computer program product of claim 13, wherein the instructions further cause the computer to:
determine an assignment for the first user included in the development plan;
automatically determine the assignment to be complete; and
automatically facilitate provision of a continuing education credit to the first user based on determining the assignment to be complete.

22. The computer program product of claim 13, wherein the one or more activities performed by the first user to fulfill the goal-related aspect of the development plan include one or more of watching a video on a professional topic, responding to feedback received from a second user that is an administrator of the first user, completing course work, submitting a journal entry on certain subject, and interacting with one or more other users in a community discussion.

23. The computer program product of claim 13, wherein the completion criteria includes requiring the one or more achievements to satisfy one or more of a due date, a predetermined level of completeness, a predetermined level of engagement, a predetermined level of difficulty, and a predetermined topic.

24. The computer program product of claim 13, wherein the development plan is sharable by a third user with a second user, the development plan is assignable by the second user to the one or more users, and the second user and the third user are administrators of the one or more users.

25. A system comprising:
one or more processors;
a plan management module executable by the one or more processors to receive data representing a development plan for one or more users, the development plan including a goal-related aspect associated with a profession; and
an achievement module executable by the one or more processors to
automatically determine one or more achievements as being achieved by querying a data store for the one or more achievements and comparing an aspect of the one or more achievements with a completion criteria, the one or more achievements reflecting one or more activities performed by a first user to fulfill the goal-related aspect of the development plan,
provide for display the one or more achievements automatically determined as being achieved to a user device of the first user,
responsive to providing for display the one or more achievements, receive an association of an achievement from the first user selected from the one or more achievements automatically determined as being achieved with the goal-related aspect of the development plan, and
associate the achievement with the goal-related aspect of the development plan responsive to receiving the association of the achievement, the achievement module being coupled to the plan management module or a data store to receive the data representing the development plan.

26. The system of claim 25, comprising:
a reporting module executable by the one or more processors to generate a report describing the progress of the first user on the development plan based on associating the achievement with the goal-related aspect of the development plan and to provide, for display, the report to the user device of the first user or a user device of a second user that is an administrator of the first user, the reporting module being coupled to the achievement module or the data store to receive the association of the achievement with the goal-related aspect.

27. The system of claim 25, comprising:
a data store; and
a communication unit for sending and receiving data via a network, wherein the data representing the development plan and data representing the one or more achievements are received via the communication unit and stored in the data store in association with the first user.

28. The system of claim 25, wherein the plan management module is further configured to receive feedback from a second user that is an administrator of the first user regarding one or more of the goal-related aspect and the achievement and to provide for display the feedback from the second user to the first user.

29. The system of claim 28, wherein the plan management module is further configured to receive, based on providing the feedback for display, a revision to the development plan, the revision including one or more of adding, modifying, and deleting one or more of a goal, an action, and a task of the development plan.

30. The system of claim 25, wherein the plan management module is further configured to provide for display a listing of one or more training resources to a user device of a second user that is an administrator of the first user, and to provide for display a listing of one or more professionals including the first user to the user device of the second user, wherein the development plan is received from the second user and includes an assignment of a training resource to one or more of the professionals including the first user for completion within a certain timeframe.

31. The system of claim 30, wherein the plan management module is further configured to assign the development plan to the first user for completion.

32. The system of claim 25, comprising:
   a reporting module executable by the one or more processors to determine an assignment for the first user included in the development plan,
   automatically determine a status for the assignment, the status describing whether the assignment has been completed by the first user,
   generate a report including the status, and
   provide for display the report to a second user for review, the second user being an administrator of the first user.

33. The system of claim 25, wherein
   the plan management module is further configured to determine an assignment for the first user included in the development plan, to automatically determine the assignment to be complete, and to automatically facilitate provision of a continuing education credit to the first user based on determining the assignment to be complete.

34. The system of claim 25, wherein the one or more activities performed by the first user to fulfill the goal-related aspect of the development plan include one or more of watching a video on a professional topic, responding to feedback received from a second user that is an administrator of the first user, completing course work, submitting a journal entry on certain subject, and interacting with one or more other users in a community discussion.

35. The system of claim 25, wherein the completion criteria includes requiring the one or more achievements to satisfy one or more of a due date, a predetermined level of completeness, a predetermined level of engagement, a predetermined level of difficulty, and a predetermined topic.

36. The system of claim 25, wherein the development plan is sharable by a third user with a second user, the development plan is assignable by the second user to the one or more users, and the second user and the third user are administrators of the one or more users.

* * * * *